US012709409B2

(12) United States Patent
Habib et al.

(10) Patent No.: US 12,709,409 B2
(45) Date of Patent: Aug. 18, 2026

(54) SYSTEM AND METHOD FOR PAYLOAD TRANSPORTATION

(71) Applicant: MightyFly Inc., Richmond, CA (US)

(72) Inventors: Manal Habib, Richmond, CA (US); Ian Fernandez, Richmond, CA (US); Brendan Michael Szuwalski, Santa Clara, CA (US); Stephane D'Urso, Sunnyvale, CA (US); Petr Ptacek, Cupertino, CA (US)

(73) Assignee: MightyFly Inc., Richmond, CA (US)

( * ) Notice: Subject to any disclaimer, the term of this patent is extended or adjusted under 35 U.S.C. 154(b) by 130 days.

(21) Appl. No.: 18/765,279

(22) Filed: Jul. 7, 2024

(65) Prior Publication Data

US 2025/0011006 A1 Jan. 9, 2025

Related U.S. Application Data

(60) Provisional application No. 63/519,210, filed on Aug. 11, 2023, provisional application No. 63/512,383, filed on Jul. 7, 2023.

(51) Int. Cl.

*B64C 9/18* (2006.01)
*B64C 29/00* (2006.01)
*B64D 9/00* (2006.01)
*B64F 1/32* (2006.01)

(52) U.S. Cl.

CPC .......... *B64F 1/322* (2020.01); *B64C 29/0025* (2013.01); *B64D 9/003* (2013.01); *B64C 29/0008* (2013.01)

(58) Field of Classification Search

CPC ............................ B64C 29/0008; B64U 30/10
See application file for complete search history.

(56) References Cited

U.S. PATENT DOCUMENTS 3,584,503 A 6/1971 Senour
7,059,566 B2 6/2006 Byers et al.
8,016,226 B1 9/2011 Wood
8,393,564 B2 * 3/2013 Kroo .................. B64C 29/0025 244/6
8,876,057 B2 11/2014 Alber et al.
8,960,592 B1 2/2015 Windisch
9,096,314 B2 8/2015 Brotherton-Ratcliffe et al.
9,580,173 B1 2/2017 Burgess et al.
10,220,963 B2 3/2019 Peverill et al.
10,239,611 B2 3/2019 Apkarian
D852,092 S 6/2019 Woodworth et al.
10,399,666 B2 9/2019 Beckman et al.
10,723,442 B2 7/2020 Greiner et al.
10,759,537 B2 9/2020 Moore et al.
10,814,974 B2 10/2020 Randall (Continued)

FOREIGN PATENT DOCUMENTS

KR 102712524 B1 * 10/2024 ............... B64C 9/18
KR 102787878 B1 * 3/2025 ............. B64U 60/55

*Primary Examiner* — Brian M O'Hara

(74) *Attorney, Agent, or Firm* — Fenwick & West LLP

(57) ABSTRACT

The invention(s) include embodiments and applications of: a system for package handling, the system including: an aerial vehicle and a conveying subsystem configured to interface with the aerial vehicle. The system can execute operation modes, associated with loading and unloading of multiple packages, and delivering one or more packages to receiving sites.

6 Claims, 15 Drawing Sheets

(56) References Cited

U.S. PATENT DOCUMENTS

| | | | |
|---|---|---|---|
| 10,839,336 | B2 | 11/2020 | Greiner et al. |
| 11,447,248 | B2 | 9/2022 | Weekes |
| 11,628,933 | B2 | 4/2023 | Weekes |
| 12,006,030 | B2 * | 6/2024 | Geuther .................... B64C 9/38 |
| 12,404,047 | B2 * | 9/2025 | Crockford ............. B64U 60/40 |
| 2003/0085319 | A1 | 5/2003 | Wagner |
| 2004/0245374 | A1 | 12/2004 | Morgan |
| 2017/0300051 | A1 | 10/2017 | Zhou et al. |
| 2017/0361928 | A1 | 12/2017 | Matsuda |
| 2018/0057161 | A1 | 3/2018 | Groninga |
| 2019/0071171 | A1 | 3/2019 | Dormiani et al. |
| 2019/0291860 | A1 | 9/2019 | Morgan |
| 2019/0322368 | A1 | 10/2019 | Melcher |

* cited by examiner

Aerial Vehicle 110'
[FRONT VIEW]

Aerial Vehicle 110'
[BACK VIEW]

Aerial Vehicle 110'
[SIDE VIEW]

Aerial Vehicle 110”
[FRONT VIEW]

Aerial Vehicle 110”
[BACK VIEW]

Aerial Vehicle 110”
[SIDE VIEW]

Aerial Vehicle 110'''
[FRONT VIEW]

Aerial Vehicle 110'''
[BACK VIEW]

Aerial Vehicle 110'''
[SIDE VIEW]

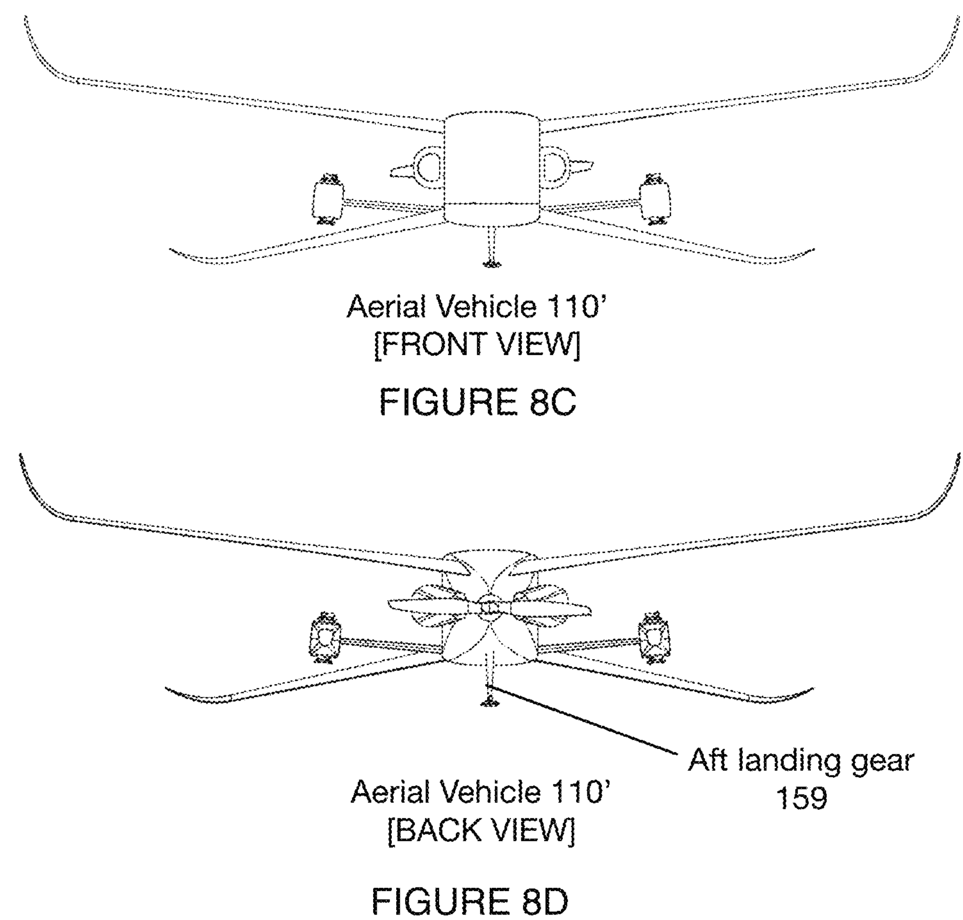
Aerial Vehicle 110'
[FRONT VIEW]
FIGURE 8C
Aerial Vehicle 110'
[BACK VIEW]
FIGURE 8D
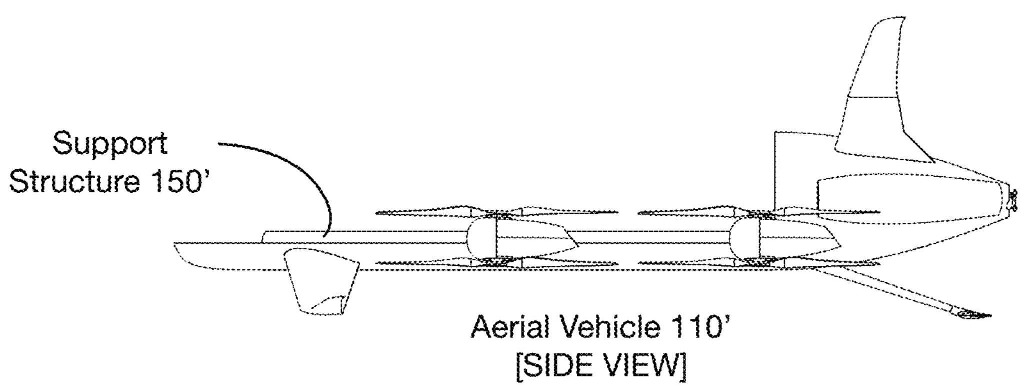
Aerial Vehicle 110'
[SIDE VIEW]
FIGURE 8E

SYSTEM AND METHOD FOR PAYLOAD TRANSPORTATION

CROSS-REFERENCE TO RELATED APPLICATIONS

This application claims the benefit of U.S. Provisional Application Ser. No. 63/512,383 filed on 7 Jul. 2023 and U.S. Provisional Application Ser. No. 63/519,210 filed 11 Aug. 2023, which are each incorporated in its entirety herein by this reference.

TECHNICAL FIELD

This invention relates generally to the field of aerial vehicles, and more specifically to a new and useful system and method for payload transportation in the field of aerial vehicles.

BACKGROUND

Current delivery platforms are subject to many limitations. Current terrestrial, marine, and aerial delivery systems are subject to inefficiencies in transportation, high physical demand required by delivery personnel, fuel requirements contributing to low sustainability (e.g., from an energy-use perspective), limited payload capacity, limitations involving endpoint operations (e.g., in relation to payload loading, in relation to payload unloading), limitations involving in-flight operations (e.g., in relation to transportation of payloads, in relation to in-air delivery of payloads), limitations involving safety aspects (e.g., in relation to safety of entities interacting with such delivery vehicles), limitations involving human interface aspects (e.g., in relation to manual control, semi-autonomous control, and/or autonomous control of delivery vehicle systems), limitations involving aerodynamic design aspects, limitations involving infrastructure requirements (e.g., landing site requirements, catapult system requirements, etc.), and/or other aspects, depending upon mode(s) of payload transportation (e.g., in relation to terrestrial delivery, in relation to delivery by boat, in relation to aerial delivery, in relation to transferring payloads between various delivery modes, etc.)

Overcoming such limitations is becoming increasingly critical, especially in high-stakes applications, where exemplary applications include first response applications (e.g., delivery of clinical materials, delivery of organs, etc.) and applications related to daily logistics and/or mission-critical operations of armed services (e.g., in the context of warfare) domestically and internationally. In particular, current express logistics methods used by the United States Air Force to ship small- to medium-sized items, such as spare parts, documentation, blood bags and medical supplies, are slow, inefficient and very expensive. Stakeholders have thus expressed a need for agile, autonomous, runway-independent cargo aircraft, and point-to-point aircraft for on-demand and express logistics.

Thus, there is a need in the field of aerial vehicles to create a new and useful system and method for package transportation.

BRIEF DESCRIPTION OF THE FIGURES

FIGS. 8A-8E depict views of a specific example of a system for payload transportation, with a cargo fairing of the system not shown.

INCORPORATION BY REFERENCE

Figure 1A:
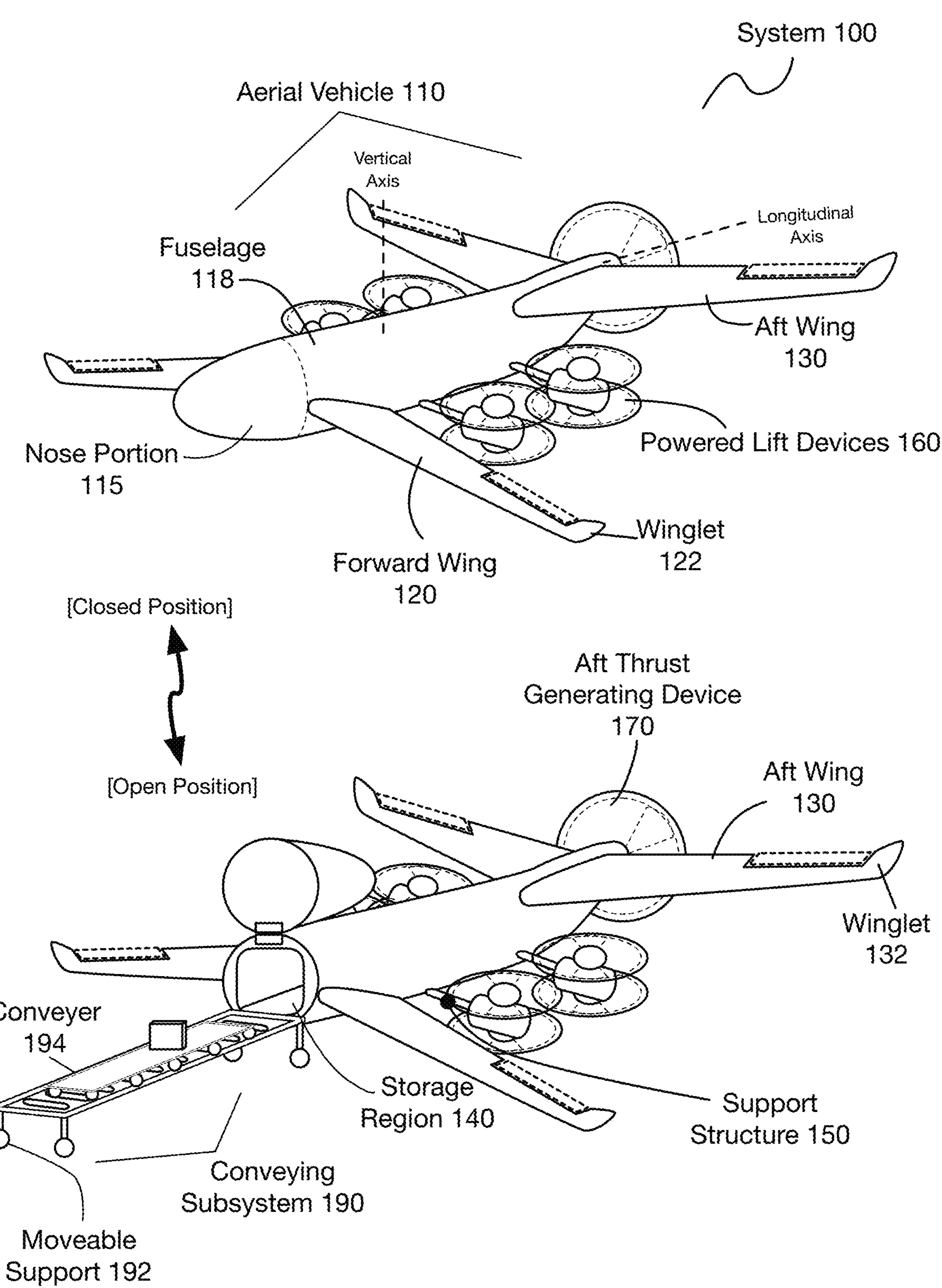
FIG. 1A depicts an embodiment of a system for payload transportation.

All publications, patents, and patent applications mentioned in this specification are herein incorporated by reference in their entireties for all purposes and to the same extent as if each individual publication, patent, or patent application was specifically and individually indicated to be incorporated by reference. Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

DESCRIPTION OF THE EMBODIMENTS

The following description of the preferred embodiments of the invention is not intended to limit the invention to these preferred embodiments, but rather to enable any person skilled in the art to make and use this invention.

1. BENEFITS

The inventions associated with the system and method can confer several benefits over conventional systems and methods, and such inventions are further implemented into many practical applications related to improvements in package delivery.

The invention(s) include end-to-end autonomous delivery systems and methods, with same-day delivery capabilities, with aerial vehicles having functionality for operating in and transitioning between vertical takeoff and landing (VTOL) modes and other flight operation modes. In relation to performance:

The inventions include embodiments, variations, and examples of aerial vehicle designs having up to a 50 pound cargo capacity, up to a 100 pound cargo capacity, up to a 200 pound cargo capacity, up to a 300 pound cargo capacity, up to a 400 pound cargo capacity, up to a 500 pound cargo capacity, up to a 600 pound cargo capacity, up to a 700 pound cargo capacity, up to a 800 pound cargo capacity, up to a 900 pound cargo capacity, up to a 1000 pound cargo capacity, intermediate capacities, or greater, attributed to structural, powerplant, and aerodynamic aspects of systems described.

The inventions include embodiments, variations, and examples of aerial vehicle designs capable of flights with up to a 100 mile range, up to a 200 mile range, up to a 300 mile range, up to a 400 mile range, up to a 500 mile range, up to a 600 mile range, up to a 700 mile range, up to a 800 mile range, up to a 900 mile range, up to a 1000 mile range, intermediate ranges, or greater, attributed to structural, powerplant, and aerodynamic aspects of systems described.

The inventions include embodiments, variations, and examples of aerial vehicle designs capable of flying with a 70 mile per hour (MPH) maximum speed, an 80 mile per hour (MPH) maximum speed, a 90 mile per hour (MPH) maximum speed, a 100 mile per hour (MPH) maximum speed, a 110 MPH maximum speed, a 120 MPH maximum speed, a 130 MPH maximum speed, a 140 MPH maximum speed, a 150 MPH maximum speed, a 160 MPH maximum speed, a 170 MPH maximum speed, a 180 MPH maximum speed, intermediate maximum speeds, or greater, attributed to structural, powerplant, and aerodynamic aspects of systems described.

The inventions include embodiments, variations, and examples of aerial vehicle designs that operate with a hybrid-electric design. In examples, the aerial vehicle designs described provide a solution for payload delivery and other applications, with respect to lowering emissions, as compared to current transportation vehicles (e.g., ground transportation vehicles, air transportation vehicles, marine transportation vessels, etc.). Alternative and additional types of propulsion are described in further detail below, where such types of propulsion include electric-powered propulsion systems, hydrogen-powered propulsion systems, and/or other propulsion system types.

The invention(s) thus employ novel aerial vehicle design features that promote efficiency in package handling and interactions with human and/or non-human entities, during delivery, flight, and ground operations.

The invention(s) also employ non-traditional systems and methods for package delivery. In particular, the invention(s) implement novel and non-obvious package loading, storing, and unloading systems that can handle package payloads described, with use of multiple wings (e.g., a forward wing and an aft wing) configured to balance wing loads about a center of gravity of the aerial vehicle. Such a design can increase the size of a positional range within which packages can be configured, with respect to a storage region of the aerial vehicle. In variations, the aerial vehicle (with forward wing and aft wing) can be configured to accommodate large changes in center of gravity associated with a payload of the aerial vehicle. In examples, the aerial vehicle (with forward wing and aft wing) can be configured to accommodate at least a 10% deviation in center of gravity associated with a payload of the aerial vehicle, at least a 20% deviation in center of gravity associated with a payload of the aerial vehicle, at least a 30% deviation in center of gravity associated with a payload of the aerial vehicle, at least a 40% deviation in center of gravity associated with a payload of the aerial vehicle, at least a 50% deviation in center of gravity associated with a payload of the aerial vehicle, or another suitable value, where deviation in center of gravity can be determined by distance in relation to references (e.g., datum and length) of the aerial vehicle.

The invention(s) also include aerodynamic surfaces designed to prevent wake of propulsion units from adversely affecting performance during flight operation modes, or transitions between various flight operation modes. For instance, the array of powered lift devices, the forward wing, and the aft wing described are positioned to prevent wakes from the array of powered lift devices and forward wing from impinging on any other component of the aerial vehicle during a hovering operation mode, a forward flight operation mode, and during transitions between the hovering operation mode and the forward flight operation mode.

The invention(s) also include aerodynamic surfaces and propulsion structures designed to limit wakes of the forward wing from adversely affecting performance during flight operation modes, or transitions between various flight operation modes.

The invention(s) also optionally include ground-contacting structures designed to protect systems and prevent damage (e.g., ground striking) during ground operations of the aerial vehicle.

The invention(s) also optionally include aerodynamic surfaces (e.g., winglets) designed to provide directional and lateral stability and to decrease aerodynamic drag during forward flight operation modes. In examples, winglets are positioned at wingtips of the aft wing, said winglets configured to increase directional and lateral stability and to decrease aerodynamic drag of the aft wing during forward flight of the aerial vehicle.

The invention(s) also include sensor subsystems positioned about the aerial vehicle, from which ground reaction forces can be sensed for characterizations of aerial vehicle center of gravity. In examples, the sensor subsystems can provide an integral subsystem comprising a set of weight sensing devices that measure and report vertical ground reaction forces acting on the aerial vehicle.

The invention(s) also include sensors positioned relative to wing elements and/or propulsion subsystems, in order to enable safety features and/or enable detect-and-avoid features described in further detail below.

The invention(s) include design features that beneficially result in reduction of non-linearities in flight physics with respect to transitions between vertical and forward flight, vertical flight, and forward flight (e.g., where vortices generated from the wing(s) of the aerial vehicle never adversely affect action of powered lift devices, powered lift devices are positioned above wakes attributed to a forward anhedral wing).

The invention(s) also include aerial vehicle designs configured such that wakes from included powered lift devices, (e.g., thrust/prop wash) never impinge upon any lifting surfaces with respect to transitions between vertical and forward flight, vertical flight, and forward flight.

The invention(s) also optionally include a payload management subsystem configured to load and unload payload components into embodiments, variations, and examples of cargo bays described, with positioning for aerial vehicle weight and balance, and securing of payloads for flight and ground operations of the aerial vehicle.

The invention(s) also include control surfaces on a forward wing and/or aft wing of the aerial vehicle, where such control surfaces allow trim for a wide range of payload center of gravities.

The invention(s) also employ safety features configured to separate moving aerial vehicle parts from human and/or non-human entities during delivery, flight, and ground operations.

The invention(s) can also be used to provide automated transmission of delivery-associated notifications and/or status updates regarding transported payloads, in collaboration with any entities associated with a chain of delivery operation phases.

Additionally or alternatively, the system and/or method can confer any other suitable benefit.

2. SYSTEM

As shown in FIG. 1, an embodiment of a system 100 for package delivery includes: an aerial vehicle 110 including a nose portion 115; a forward wing 120 coupled to a first portion of a fuselage 118 of the aerial vehicle 110; an aft wing 130 coupled a second portion of the fuselage 118 of the aerial vehicle 110; a storage region 140 positioned longitudinally between the forward wing 120 and the aft wing 130, the storage region 140 configured for receiving and transporting a payload; a support structure 150 positioned near a ventral side of the fuselage 118 and coupled to a first set of powered lift devices 160; and a forward thrust generating device 170 coupled to the fuselage 118.

In variations, the system 100 can further include sensors coupled to the aerial vehicle 110 and positioned relative to the wing(s), ground support elements, and/or thrust generation devices of the aerial vehicle 110, in order to enable safety features and/or enable detect-and-avoid features described in further detail below.

In variations, the system can further include structural features and wing sections that provide improved directional stability (e.g., directional static stability, directional dynamic stability). In variations, such features can include one or more of: a vertical stabilizer, a dorsal fin, a ventral fin, other vertical or approximately vertical features positioned at the wingtips (e.g., as winglets, as surfaces positioned at wingtips, etc.), where such structural features are described in further detail below. In variations, the aerial vehicle can include a vertical stabilizer, a ventral fin, and/or a dorsal fin positioned at an aft region of the fuselage of the aerial vehicle.

Figure 4:
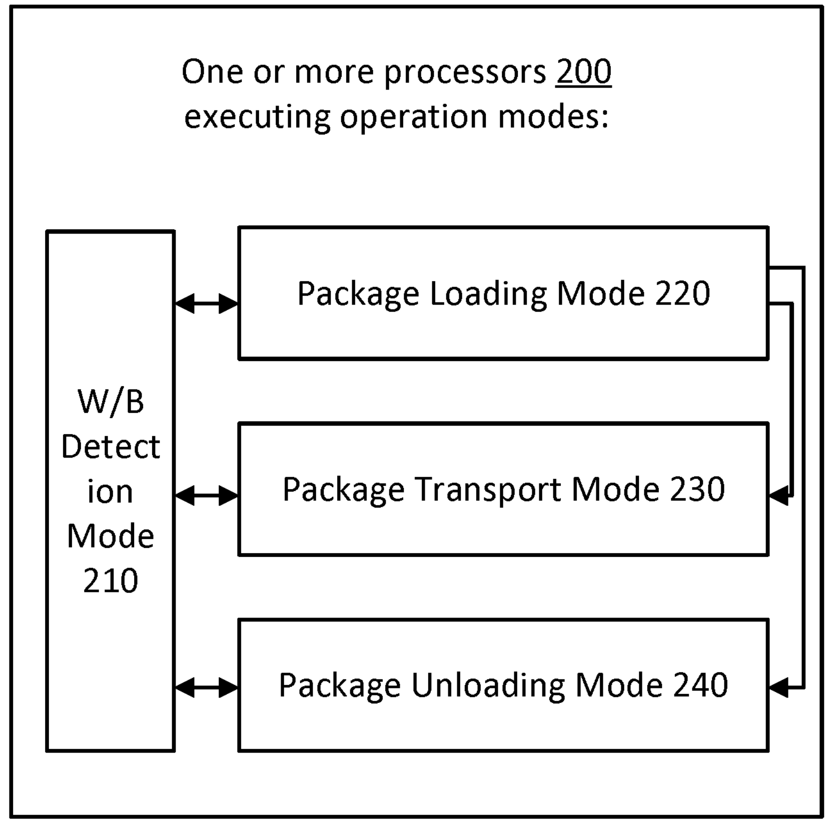
FIG. 4 depicts an embodiment of various operation modes of a system for payload transportation.

As shown in FIG. 4, embodiments of the system 100 can be configured to execute a set of operation modes including one or more of: a weight and balance detection mode 210, a package loading mode 220, a package transport mode 230, and a package unloading mode 240, where various aspects of the system configurations in each mode are further described in Section 2.4 below.

The system 100 functions to receive, handle, and facilitate delivery of packages, with aspects configured for loading, storing, and unloading of payloads in a manner that accounts for weight and balance considerations, and provides improved stability with respect to positioning of payload components at the aerial vehicle 110. In relation to package delivery, the system 100 functions to operate with aerodynamic efficiency, by employing novel aerodynamic designs. The system 100 also functions to provide features intended to improve safety of entities with which the aerial vehicle 110 interacts.

In particular, the system 100 includes an aerial vehicle that incorporates a novel forward wing and aft wing, which enables relatively larger trimming of the aerodynamic center of lift as compared to conventional mono-wing aircraft.

The system 100 can be configured to implement one or more portions of the method(s) described in Section 3 below, but can additionally or alternatively be configured to implement other suitable methods (e.g., related to transportation of non-package entities or objects).

2.1 System—Aerial Vehicle, Wing Elements, and Storage

As shown in FIG. 1A, an embodiment of a system 100 for package delivery includes: an aerial vehicle 110 including a nose portion 115; a forward wing 120 coupled to a first portion of a fuselage 118 of the aerial vehicle 110; an aft wing 130 coupled a second portion of the fuselage 118 of the aerial vehicle 110; and a storage region 140 positioned longitudinally between the forward wing 120 and the aft wing 130, the storage region 140 configured for receiving and transporting a payload. The aerial vehicle 110 functions to provide reliable and consistent performance in relation to package handling and delivery, with performance achievements in payload weight capabilities, flight range capabilities, flight speed capabilities, and other performance achievements.

Figure 1B:
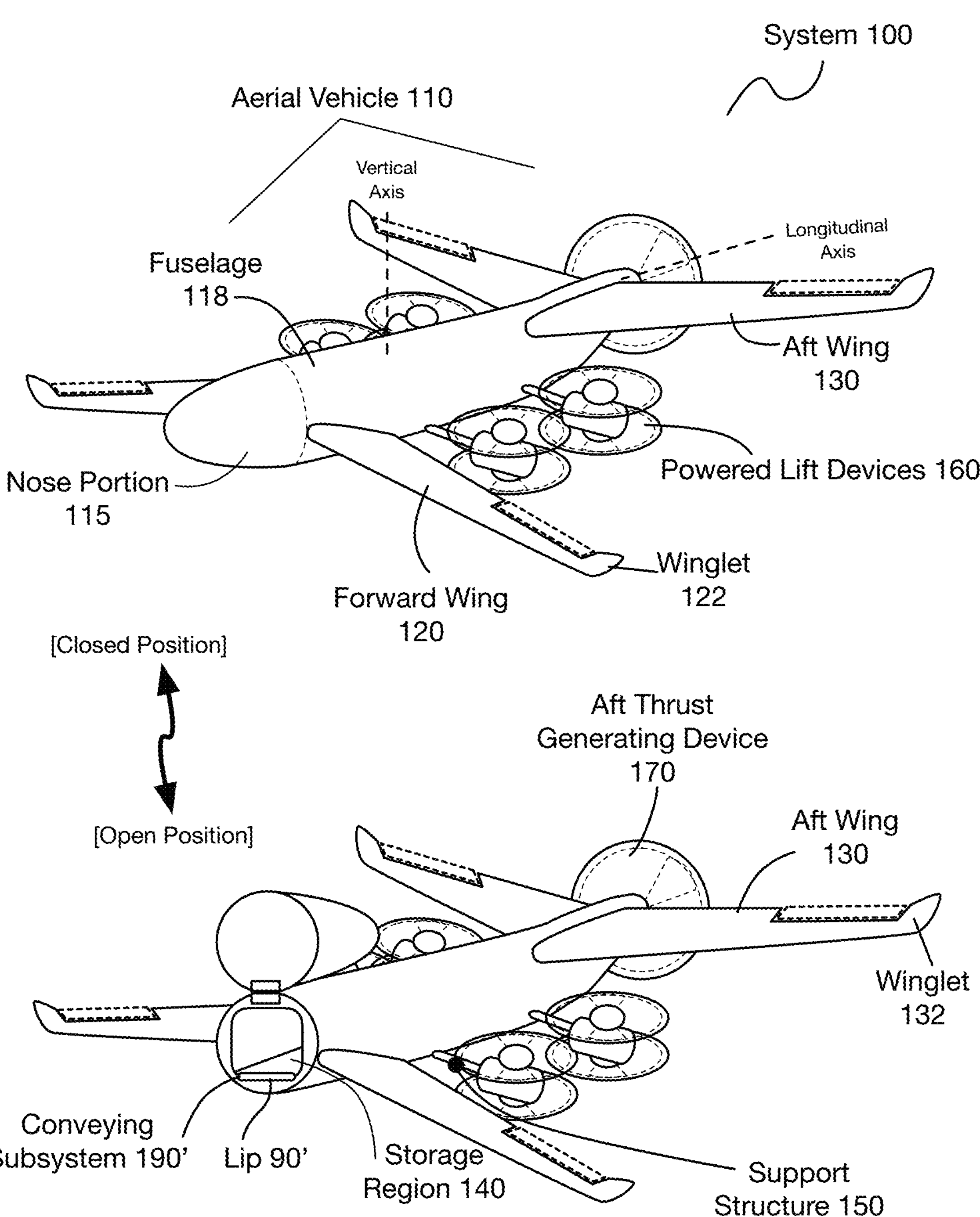
FIG. 1B depicts another embodiment of a system for payload transportation.
Figure 1C:
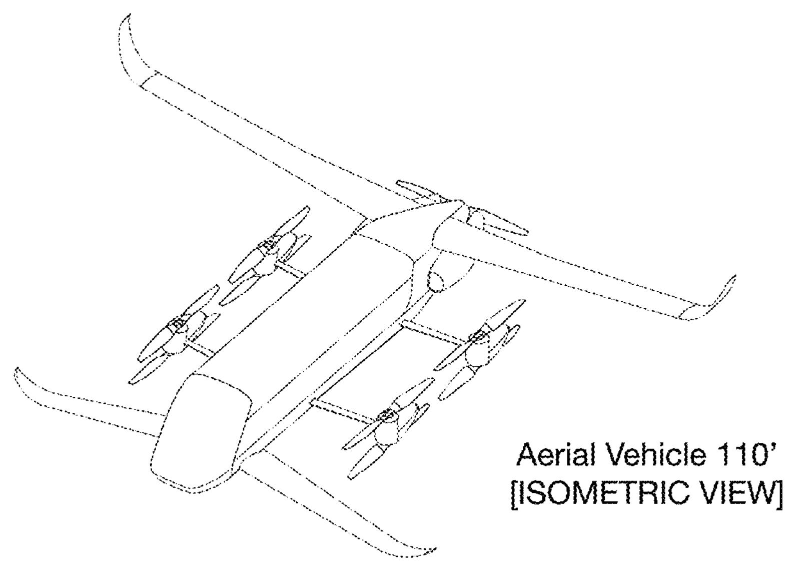
FIGS. 1C-1G depict views of a specific example of a system for payload transportation.
Figure 1D:
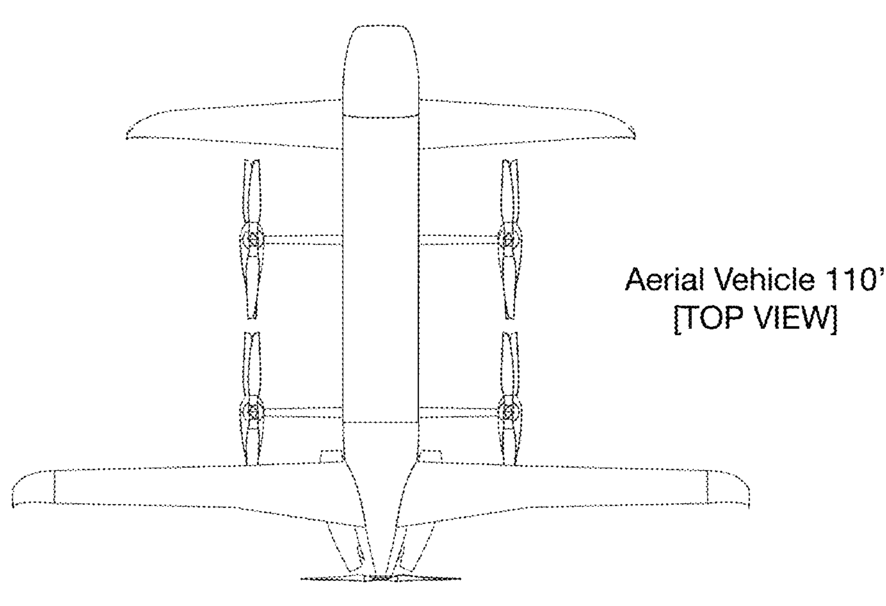

As shown in FIG. 1B, an embodiment of a system 100 for package delivery includes: an aerial vehicle 110 including a nose portion 115; a forward wing 120 coupled to a first portion of a fuselage 118 of the aerial vehicle 110; an aft wing 130 coupled a second portion of the fuselage 118 of the aerial vehicle 110; and a storage region 140 positioned longitudinally between the forward wing 120 and the aft wing 130, the storage region 140 configured for receiving and transporting a payload. The system 100 shown in FIG. 1B additionally shows a conveying subsystem 190', for loading and/or unloading of packages to and/or from the aerial vehicle 110. In particular, the conveying subsystem 190' provides mechanisms for autonomously transferring payload to and from the storage region 140, autonomously positioning cargo to meet weight and balance criteria, and autonomously securing payloads for flight operations and/or other operations. The conveying subsystem can thus be configured to autonomously transfer the payload to and from the storage region, to autonomously position the payload to satisfy a weight and balance criterion, and to autonomously secure the payload in preparation for flight, and to increase safety of flight of the aerial vehicle.

In addition to novel and custom features described in more detail below, the aerial vehicle 110 can include combinations of features of one or more of: fixed-wing aerial vehicles, rotorcraft, multi-copter aerial vehicles, quad-plane vehicles, vertical-takeoff-and-landing (VTOL) vehicles, including electric VTOL (eVTOL) vehicles, and/or other forms of aerial vehicles.

The aerial vehicle 110 includes a power system for generation of power associated with ground and flight operations, and in variations, the power plant can include one or more of: electric motors, fuel-powered motors, hydrogen fuel cell-based designs, other fuel cell-based designs, and/or other machines that convert energy from one source to energy for thrust generation for operations of the aerial vehicle 110. In specific examples, the aerial vehicle 110 can include a hybrid power system that uses a combination of battery power and fuel in order to affect operation modes of the aerial vehicle 110. In a specific example, the fuel used includes JP-8 fuel; however, variations of the aerial vehicle 110 can alternatively be designed for and certified for use of other fuel types. In examples, the aerial vehicle can be full-electric, or powered by fuel cells. In examples, the aerial vehicle 110 can include a hybrid power system that uses a combination of battery power and fuel cells.

The aerial vehicle 110 can have a longitudinal axis, along which there is a forward direction and an aft direction, relative to a center of gravity (CG) of the aerial vehicle 110. As described in further detail below, lift-producing surfaces, and other elements of the aerial vehicle can be positioned along the fuselage, in order to achieve functionality and performance behavior, as described in Section 1 above, and in more detail below, with respect to each element.

In embodiments, variations, and examples, the aerial vehicle 110 is capable of flights with up to a 100 mile range, up to a 200 mile range, up to a 300 mile range, up to a 400 mile range, up to a 500 mile range, up to a 600 mile range, up to a 700 mile range, up to a 800 mile range, up to a 900 mile range, up to a 1000 mile range, intermediate ranges, or greater, attributed to structural, powerplant, and aerodynamic aspects of systems described.

In embodiments, variations, and examples, the aerial vehicle 110 is capable of flying with a 70 mile per hour (MPH) maximum speed, an 80 mile per hour (MPH) maximum speed, a 90 mile per hour (MPH) maximum speed, a 100 mile per hour (MPH) maximum speed, a 110 MPH maximum speed, a 120 MPH maximum speed, a 130 MPH maximum speed, a 140 MPH maximum speed, a 150 MPH maximum speed, a 160 MPH maximum speed, a 170 MPH maximum speed, a 180 MPH maximum speed, intermediate maximum speeds, or greater, attributed to structural, powerplant, and aerodynamic aspects of systems described.

In embodiments, variations, and examples, the aerial vehicle 110 is capable of flying with an endurance of 100 minutes, an endurance of 150 minutes, an endurance of 200 minutes, an endurance of 250 minutes, an endurance of 300 minutes, an endurance of 350 minutes, an endurance of 400 minutes, an endurance of 450 minutes, an endurance of 500 minutes, an endurance of 600 minutes, an endurance of 700 minutes, an endurance of 800 minutes, an endurance of 900 minutes, an endurance of 1000 minutes, intermediate endurances, or greater, attributed to structural, powerplant (e.g., hybrid design, with battery and fuel configurations), and aerodynamic aspects of systems described.

In embodiments, variations, and examples, the aerial vehicle 110 has a length of approximately 8 feet, 9 feet, 10 feet, 11 feet, 12 feet, 13 feet, 14 feet, 15 feet, 16 feet, 17 feet, 18 feet, 19 feet, 20 feet, 25 feet, 30 feet, an intermediate length, another suitable length, or greater depending upon the mission(s) required by the aerial vehicle 110. In embodiments, variations, and examples, the aerial vehicle 110 has a width of approximately 10 feet, 11 feet, 12 feet, 13 feet, 14 feet, 15 feet, 16 feet, 17 feet, 18 feet, 19 feet, 20 feet, 25 feet, 30 feet, 35 feet, 40 feet, an intermediate width, another suitable width, or greater depending upon the mission(s) required by the aerial vehicle 110 (e.g., in relation to wing spans, in relation to payload capacity needs, etc.). In embodiments, variations, and examples, the aerial vehicle 110 has a height of approximately 3 feet, 4 feet, 5 feet, 6 feet, 7 feet, 8 feet, 9 feet, 10 feet, 11 feet, 12 feet, 13 feet, 14 feet, 15 feet, an intermediate height, another suitable height, or greater, depending upon the mission(s) required by the aerial vehicle 110.

In embodiments, variations, and examples, the aerial vehicle 110 has a maximum gross weight of approximately 200 pounds, approximately 250 pounds, approximately 300 pounds, approximately 350 pounds, approximately 400 pounds, approximately 450 pounds, approximately 500 pounds, approximately 550 pounds, approximately 600 pounds, approximately 650 pounds, approximately 700 pounds, approximately 800 pounds, approximately 900 pounds, 1000 pounds, 2000 pounds, 3000 pounds, 4000 pounds, an intermediate weight, another suitable maximum gross weight, or greater, depending upon the mission(s) required by the aerial vehicle 110.

In embodiments, variations, and examples, the aerial vehicle 110 has a useful load of approximately 50 pounds, approximately 60 pounds, approximately 70 pounds, approximately 80 pounds, approximately 90 pounds, approximately 100 pounds, approximately 120 pounds, approximately 140 pounds, approximately 160 pounds, approximately 180 pounds, approximately 200 pounds, approximately 250 pounds, approximately 300 pounds, approximately 350 pounds, approximately 400 pounds, approximately 500 pounds, approximately 600 pounds, approximately 700 pounds, approximately 800 pounds, approximately 900 pounds, approximately 1000 pounds, approximately 1100 pounds, approximately 1200 pounds, approximately 1300 pounds, approximately 1400 pounds, approximately 1500 pounds, an intermediate weight, another suitable useful load, or greater depending upon the mission(s) required by the aerial vehicle 110.

In embodiments, variations, and examples, the aerial vehicle 110 has an empty weight of approximately 70 pounds, approximately 80 pounds, approximately 90 pounds, approximately 100 pounds, approximately 120 pounds, approximately 140 pounds, approximately 160 pounds, approximately 180 pounds, approximately 200 pounds, approximately 250 pounds, approximately 300 pounds, approximately 350 pounds, approximately 400 pounds, approximately 500 pounds, approximately 600 pounds, approximately 700 pounds, approximately 800 pounds, approximately 900 pounds, approximately 1000 pounds, approximately 1100 pounds, approximately 1200 pounds, approximately 1300 pounds, approximately 1400 pounds, approximately 1500 pounds, approximately 1600 pounds, approximately 1700 pounds, approximately 1800 pounds, approximately 1900 pounds, approximately 2000 pounds, an intermediate weight, another suitable useful load, or greater depending upon the mission(s) required by the aerial vehicle 110.

In embodiments, variations, and examples, the aerial vehicle 110 has a fuel weight of approximately 0 pounds (e.g., for an all-electric design, 5 pounds, approximately 10 pounds, approximately 15 pounds, approximately 20 pounds, approximately 25 pounds, approximately 30 pounds, approximately 35 pounds, approximately 40 pounds, approximately 45 pounds, approximately 50 pounds, approximately 55 pounds, approximately 60 pounds, approximately 65 pounds, approximately 75 pounds, approximately 85 pounds, approximately 95 pounds, approximately 100 pounds, approximately 200 pounds, approximately 300 pounds, approximately 400 pounds, approximately 500 pounds, an intermediate weight, another suitable fuel weight, or greater, depending upon the mission(s) required by the aerial vehicle 110.

In embodiments, variations, and examples, the aerial vehicle 110 has a battery weight of approximately 5 pounds, approximately 10 pounds, approximately 15 pounds, approximately 20 pounds, approximately 25 pounds, approximately 30 pounds, approximately 35 pounds, approximately 40 pounds, approximately 45 pounds, approximately 50 pounds, approximately 100 pounds, approximately 200 pounds, approximately 300 pounds, approximately 400 pounds, approximately 500 pounds, approximately 600 pounds, approximately 700 pounds, approximately 800 pounds, approximately 900 pounds, approximately 1000 pounds, an intermediate weight, another suitable battery weight, or greater, depending upon the mission(s) required by the aerial vehicle 110.

A specific example of the aerial vehicle 110' is shown in FIGS. 1C through 1G. Additional aspects of the aerial vehicle 110 are further described in more detail below.

2.1.1 Aerial Vehicle—Nose Portion

As noted above, the aerial vehicle 110 can include a nose portion 115, where the nose portion 115 can have an open position and a closed position of operation. The open position provides access for loading and/or unloading of packages using the package conveying elements described below, and the closed position is used primarily during storage and/or transport of one or more packages by the aerial vehicle 110.

Figure 5:
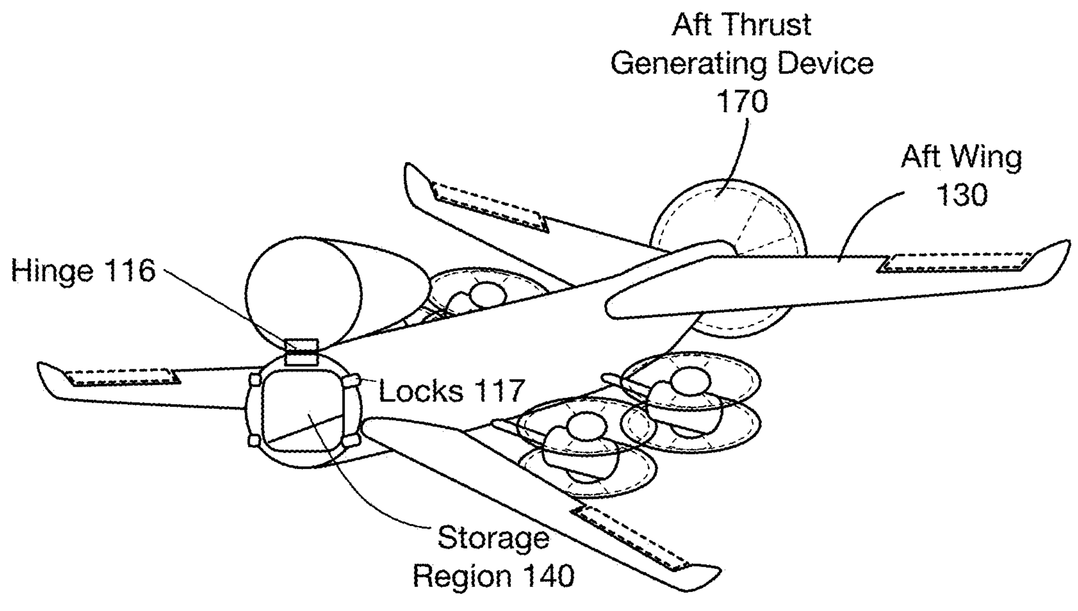
FIG. 5 depicts a configuration of an embodiment of a system for payload transportation.

In relation to transitioning of the nose portion 115 between the open position and the closed position, the aerial vehicle 110 can include one or more structures that provide mechanisms for transitions between the open position and the closed position. In one variation, as shown in FIG. 5, the aerial vehicle 110 can include a hinge 116 (e.g., a hinge positioned near a dorsal portion of the nose region of the aerial vehicle 110), where the hinge 116 allows the nose portion 115 to transition between open and closed positions. In transitioning the nose portion 115 between the open position and closed position, the nose portion 115 can include one or more actuators (e.g., mechanical actuators, hydraulic actuators, etc.) for opening and closing the nose portion 115.

Furthermore, the hinge 116 and associated mechanisms can cooperate to retain the nose portion 115 in the open position, in the closed position, and/or positions intermediate to the open position and the closed position (e.g., at discrete positions, along a continuum between the open position and the closed position). Furthermore, the nose portion 115 can include a locking mechanism (e.g., one or more latches, etc.) configured to reversibly lock the nose portion in the closed position and/or at other positions. As shown in FIG. 5, locks 117 can be positioned bilaterally on opposing sides of the fuselage, at interfaces where the nose portion 115 meets the remainder of the fuselage (e.g., in the closed position). Additionally or alternatively, mechanisms associated with the nose portion 115 can be configured for sliding of the nose portion 115 between open and/or closed positions.

A specific example of the nose portion 115' in the open configuration is shown in FIGS. 1H-1L.

Another specific example of the aerial vehicle 110" is shown in FIGS. 2A-2E, where the aerial vehicle 110" includes a forward wing 120" and an aft wing 130" with increased dihedral and winglets 132" with greater surface area to provide lateral/directional stability and desired aerodynamic characteristics for various operations, as well as aft landing gear 159".

2.1.2 Aerial Vehicle—Forward Wing

As shown in FIGS. 1A and 1B, the aerial vehicle 110 includes a forward wing 120 coupled to a first portion of a fuselage 118 of the aerial vehicle 110, where the forward wing 120 serves several functions. The forward wing 120 functions, with the aft wing 130 (described in more detail below), to provide balancing of lift loads about a center of gravity (CG) of the aerial vehicle 110, to reduce sensitivity of load centering requirements with respect to CG of the aerial vehicle 110 (e.g., by increasing a distance range about the CG, within which loads can be positioned and distributed), to provide support and stability for landing components and ground operations (e.g., with anhedral form described in more detail below), to support sensor systems for aspects related to CG determination (e.g., in loaded and unloaded configurations of the aerial vehicle 110) and payload distribution determination, to support sensor systems for safety features and/or detect-and-avoid functions, and to serve additional functions described.

The forward wing 120 can be positioned such that wing loads attributed to the forward wing 120 and the aft wing 130 are relatively balanced about the center of gravity of the aerial vehicle 110. Longitudinally, and depending upon the overall length of the aerial vehicle 110, the forward wing 120 can be positioned away from a reference position (e.g., empty CG, longitudinal center, nose position, tail position, etc.) of the aerial vehicle 110 in a forward direction by a distance that is 5%, 10%, 15%, 20%, 25%, 30%, 40%, 50%, 60%, 70%, 80%, 90%, 100%, an intermediate percent, or another suitable percent of the length of the aerial vehicle from the reference position, thereby increasing the ability (with the aft wing 130) of the aerial vehicle to handle significant shifts in payload CG associated with the storage region 140 and cargo bay described in more detail below.

The forward wing 120 can include control surfaces, where such control surfaces aerodynamically affect flight of the aircraft relative to a pitch axis (i.e., a transverse axis), a yaw axis (i.e., a vertical axis), and/or a roll axis (i.e., longitudinal axis) of the aerial vehicle 110. Control surfaces can include one or more of: ailerons, flaps, elevators, stabilizers (e.g., horizontal stabilizers), spoilers, slats, air brakes, vortex generators, trim surfaces, and other suitable control surfaces. With displacement of the forward wing 120 from the reference position of the aerial vehicle 110 along the fuselage 118 in the forward direction, moment arms for control surface forces and respective operation states of such control surfaces are increased. While various control surfaces are described, embodiments, variations, and examples of the aerial vehicle can include additional control surfaces and/or omit one or more control surface elements described, where the control surfaces collectively allow for control and/or trim for a wide range of payload center of gravities.

As shown in FIGS. 1A-1G, the forward wing 120 is configured with anhedral form. In variations, the forward wing 120 can include features that support landing operations of the aerial vehicle, by providing support for landing, and/or support for the aerial vehicle 110 when the aerial vehicle 110 is in a landed configuration.

The angle of anhedral of the forward wing 120 can be 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees, 24 degrees, 25 degrees, an intermediate angle, or another suitable angle relative to a horizontal plane.

Upward sloping winglets can be positioned at outboard tips of the forward wing 120, wherein the upward sloping winglets are configured to prevent wing tip dig in during landing of the aerial vehicle 110, and wherein the upward sloping winglets are configured to decrease aerodynamic drag during forward flight of the aerial vehicle 110.

In variations, bottom surfaces (e.g., inferior surfaces, surfaces underside) of the forward wing 120 proximal the tip(s) of the forward wing 120 can include features/landing devices that serve as landing contacts (e.g., pads, skids, gears with wheels, etc.). The landing contacts 121 can be positioned contralaterally and symmetrically at undersides of the wing tips of the forward wing 120, and be configured to prevent damage (e.g., mechanical damage) to the forward wing 120 and other portions of the aerial vehicle 110 during operation. As such, landing elements can be coupled to wing tips of the forward wing. The landing contacts 121 can be removable and replaceable in alternative variations. Alternatively the landing contacts 121 can be retractable (e.g., in order to provide reduced drag performance) in alternative variations.

In variations, related to landing operations, the forward wing 120 can function as a spring or provide other elastic behavior to attenuate landing loads. Elastic behavior can be attributed to a morphology of the forward wing, where a wingspan of the forward wing 120 can be approximately 10 feet, 11 feet, 12 feet, 13 feet, 14 feet, 15 feet, 16 feet, 17 feet, 18 feet, 19 feet, 20 feet, 25 feet, 30 feet, an intermediate width, another suitable wingspan, or greater, where the wingspan and forces applied to the wing during landing operations and landed configurations maintain the forward wing 120 in an elastic deformation regime without significantly increasing cyclic failure performance attributed to flight operations. Elastic behavior of the forward wing 120 to attenuate landing gear loads can also be attributed to material composition of the forward wing 120 or a portion (e.g., high-stress portion) of the forward wing 120. Materials used can include polymers and/or metals (e.g., steel, aluminum, titanium, etc.).

As such, a set of landing devices can be coupled to the forward wing, with the forward wing acting to attenuate landing gear loads.

As shown in FIGS. 1A-1G, the forward wing 120 can optionally include forward wing winglets 122, such as upward-sloping contralateral winglets, which can function to decrease aerodynamic drag due to vortices during forward flight of the aerial vehicle 110, thereby providing improved fuel efficiency and cruising range, in relation to performance attributes described. The forward wing winglets 122 also function to prevent the tips of the forward wing 120 from digging into a ground surface or otherwise preventing damage of the tips of the forward wing 120, in association with landing operations and/or landed configurations of the aerial vehicle 110.

Figure 6:
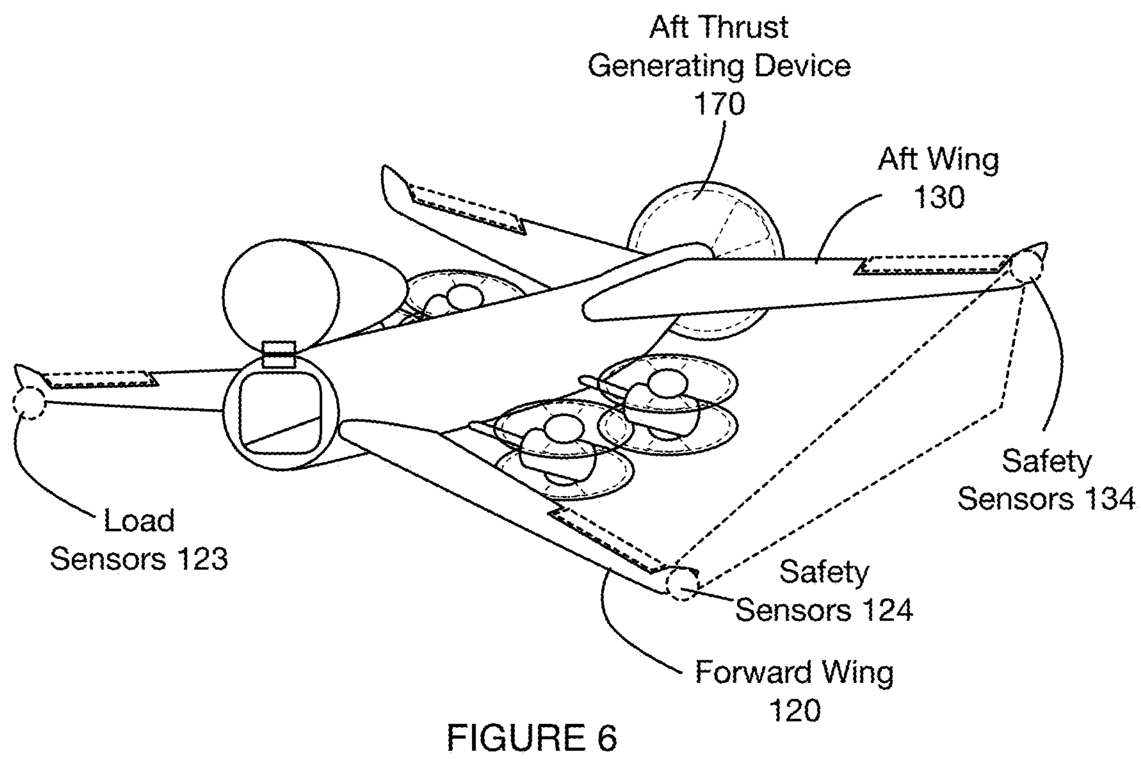
FIG. 6 depicts a configuration of an embodiment of a system for payload transportation, including load-sensing features and safety features.

As shown in FIG. 6, the forward wing 120 can include a set of load sensors 123, that operate, with load sensors of other portions of the aerial vehicle 110, to enable determination of ground reaction forces and determination of CG of the aerial vehicle dynamically (e.g., during various operation modes of the aerial vehicle 110, during changes in loading configurations of the aerial vehicle due to payload changes, fuel changes, battery configuration changes, etc.). Such information can also be used to guide load balancing operations of the aerial vehicle 110.

As shown in FIG. 6, the forward wing 120 can also include a set of safety sensors 124 (e.g., positioned near wing tips), which function to prevent unintentional access to moving components (e.g., thrust generation devices) positioned near the fuselage 118 of the aerial vehicle 110. The set of safety sensors 124 can include optical sensors that detect visible and/or infrared radiation directly associated with objects within a field of view or path associated with access to moving components (e.g., thrust generation devices) positioned near the fuselage 118 of the aerial vehicle 110. The set of safety sensors 124 can additionally or alternatively include optical sensors that detect disruption of a controlled configuration of light (e.g., laser light, a curtain of light) provided in coordination with elements of the aft wing 130 or other portions of the aerial vehicle 110. The set of safety sensors 124 can thus be positioned near the wingtips of the forward wing 120, or otherwise configured.

2.1.3 Aerial Vehicle—Aft Wing

The aft wing 130 can be positioned such that wing loads attributed to the forward wing 120 and the aft wing 130 are relatively balanced about the center of gravity of the aerial vehicle 110. Longitudinally, and depending upon the overall length of the aerial vehicle 110, the aft wing 120 can be positioned away from a reference position (e.g., empty CG, longitudinal center, nose position, tail position, etc.) of the aerial vehicle 110 in an aft direction by a distance that is 5%, 10%, 15%, 20%, 25%, 30%, 40%, 50%, 60%, 70%, 80%, 90%, 100%, an intermediate percent, or another suitable percent of the length of the aerial vehicle from the reference position, thereby increasing the ability (with the forward wing 120) of the aerial vehicle to handle significant shifts in payload CG associated with the storage region 140 and cargo bay described in more detail below. Further, the aft wing 130 can be configured to counteract the anhedral form of the forward wing, provide mainly lateral and then directional stability, enhance spin recovery, and wake effects of powered lift devices with respect to transitions between vertical and forward flight, vertical flight, and forward flight.

The aft wing 130 can include control surfaces, where such control surfaces aerodynamically affect flight of the aircraft relative to a pitch axis (i.e., a transverse axis), a yaw axis (i.e., a vertical axis), and/or a roll axis (i.e., longitudinal axis) of the aerial vehicle 110. Control surfaces can include one or more of: ailerons, flaps, elevators, stabilizers (e.g., horizontal stabilizers), spoilers, slats, air brakes, vortex generators, trim surfaces, and other suitable control surfaces. With displacement of the aft wing 130 from the reference position of the aerial vehicle 110 along the fuselage 118 in the aft direction, moment arms for control surfaces and respective operation states of such control surfaces are increased. While various control surfaces are described, embodiments, variations, and examples of the aerial vehicle can include additional control surfaces and/or omit one or more control surface elements described, where the control surfaces collectively allow for control and/or trim for a wide range of payload center of gravities.

As shown in FIGS. 1A-1F, the aft wing 130 is configured with dihedral form. The dihedral form of the aft wing 130 can also function to counteract or balance performance attributed to anhedral form of the forward wing 120, to provide positive yaw/roll interactions, to enhance spin recovery, and to avoid wake of thrust generation devices (e.g., vertical propulsion units along the fuselage 118) described in more detail below. As such, the aft wing 130 can be configured to balance performance of the aerial vehicle 110 in coordination with anhedral angle or other wing configurations of the aerial vehicle 110 (e.g., such as an anhedral angle of the forward wing 120). As such, a dihedral angle of the aft wing can be configured to counteract an anhedral angle of the forward wing, in order to provide lateral and then directional stability, and enhance spin recovery of the aerial vehicle.

The angle of dihedral of the aft wing 130 can be 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees, 24 degrees, 25 degrees, an intermediate angle, or another suitable angle relative to a horizontal plane.

As shown in FIGS. 1A-1F, the aft wing 130 can optionally include aft wing winglets 132, such as upward-sloping winglets, which can function to provide stability and decrease aerodynamic drag due to vortices during forward flight of the aerial vehicle 110, thereby providing improved fuel efficiency and cruising range, in relation to performance attributes described.

As shown in FIG. 6, the aft wing 130 can also include a set of safety sensors 134 (e.g., positioned near wing tips), which function to prevent unintentional access to moving components (e.g., thrust generation devices) positioned near the fuselage 118 of the aerial vehicle 110. The set of safety sensors 134 can include optical sensors that detect visible and/or infrared radiation directly associated with objects within a field of view or path associated with access to moving components (e.g., thrust generation devices) positioned near the fuselage 118 of the aerial vehicle 110. The set of safety sensors 134 can additionally or alternatively include optical sensors that detect disruption of a controlled configuration of light (e.g., laser light, a curtain of light) provided in coordination with elements of the forward wing 120 or other portions of the aerial vehicle 110. The set of safety sensors 134 can thus be positioned near the wingtips of the aft wing 130, or otherwise configured.

While embodiments of the aerial vehicle 110 are described as having an anhedral forward wing 120 and a dihedral aft wing 130, one or both of the forward wing 120 and the aft wing 130 can be configured without anhedral or dihedral form. Alternatively, the forward wing 120 can be configured with dihedral and the aft wing 130 can be configured with anhedral (e.g., with incorporation of an aft landing support structure, such as a nose gear with a wheel, nose pad, nose skid, or other support structure).

2.1.4 Aerial Vehicle—Storage Region

As shown in FIGS. 1A and 1B, the aerial vehicle 110 includes a storage region 140 positioned longitudinally between the forward wing 120 and the aft wing 130, where the storage region 140 is configured for receiving a payload, transporting a payload, and/or facilitating unloading of a payload or portions thereof for delivery.

The storage region 140 can be primarily internal to the aerial vehicle 110, and functions as a cargo bay for receiving, carrying, and enabling removal of packages. In embodiments, variations, and examples, the storage region 140 can support up to a 50 pound cargo capacity, up to a 100 pound cargo capacity, up to a 200 pound cargo capacity, up to a 300 pound cargo capacity, up to a 400 pound cargo capacity, up to a 500 pound cargo capacity, up to a 600 pound cargo capacity, up to a 700 pound cargo capacity, up to a 800 pound cargo capacity, up to a 900 pound cargo capacity, up to a 1000 pound cargo capacity, or greater, attributed to structural, powerplant, and aerodynamic aspects of systems described.

In embodiments, variations, and examples, the storage region has a length of approximately 40 inches, 45 inches, 50 inches, 55 inches, 60 inches, 65 inches, 70 inches, 75 inches, 80 inches, 85 inches, 90 inches, 95 inches, 100 inches, 110 inches, 120 inches, 130 inches, 140 inches, 150 inches, 160 inches, 170 inches, 180 inches, 190 inches, 200 inches, an intermediate length, another suitable length, or greater. In embodiments, variations, and examples, storage region 140 has a width of approximately 5 inches, 10 inches, 15 inches, 20 inches, 25 inches, 30 inches, 35 inches, 40 inches, 45 inches, 50 inches, 55 inches, 60 inches, an intermediate width, another suitable width, or greater, depending upon the mission(s) required by the aerial vehicle 110. In embodiments, variations, and examples, the storage region 140 has a height of approximately 5 inches, 10 inches, 15 inches, 20 inches, 25 inches, 30 inches, 35 inches, 40 inches, 45 inches, 50 inches, 55 inches, 60 inches, an intermediate height, another suitable height, or greater, depending upon the mission(s) required by the aerial vehicle 110.

Figure 7:
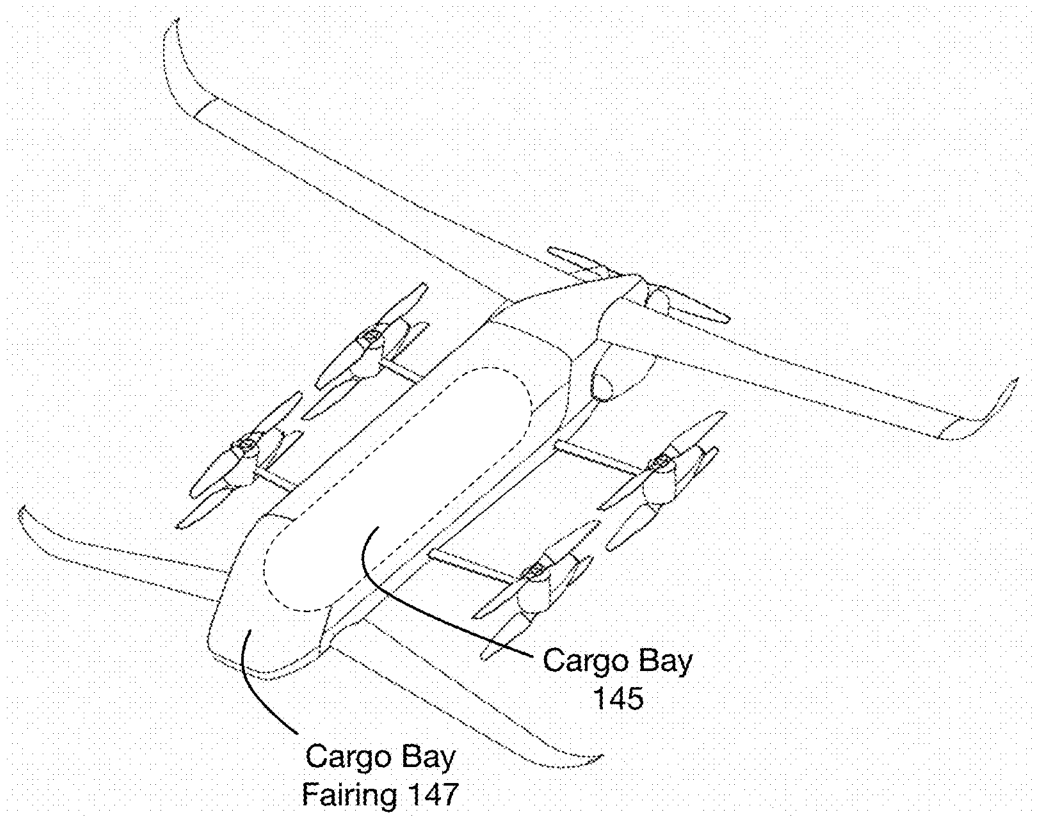
FIG. 7 depicts aspects of a storage region of a system for payload transportation, including load-sensing features and safety features.
Figure 8A:
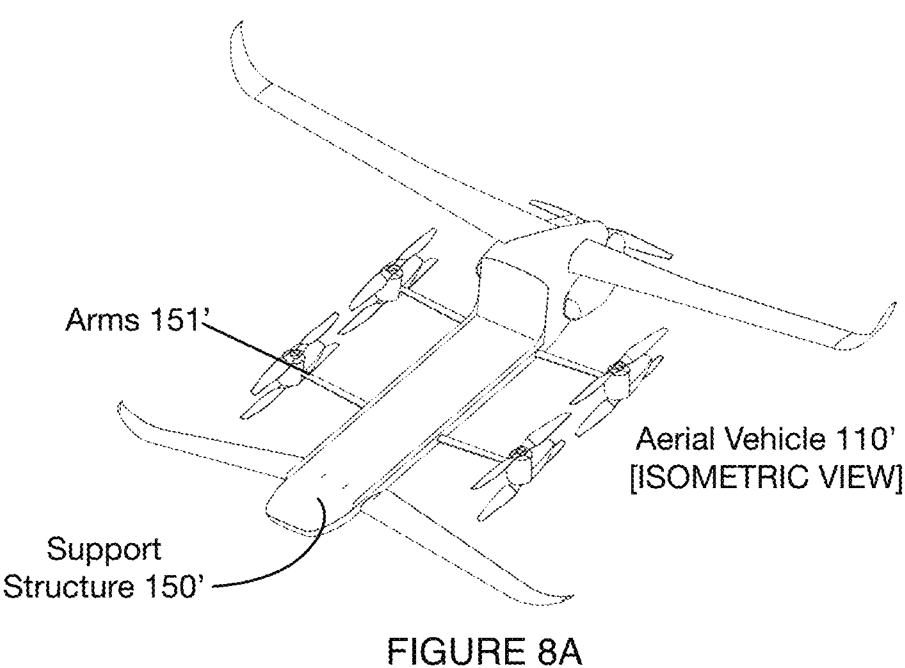
Figure 8B:
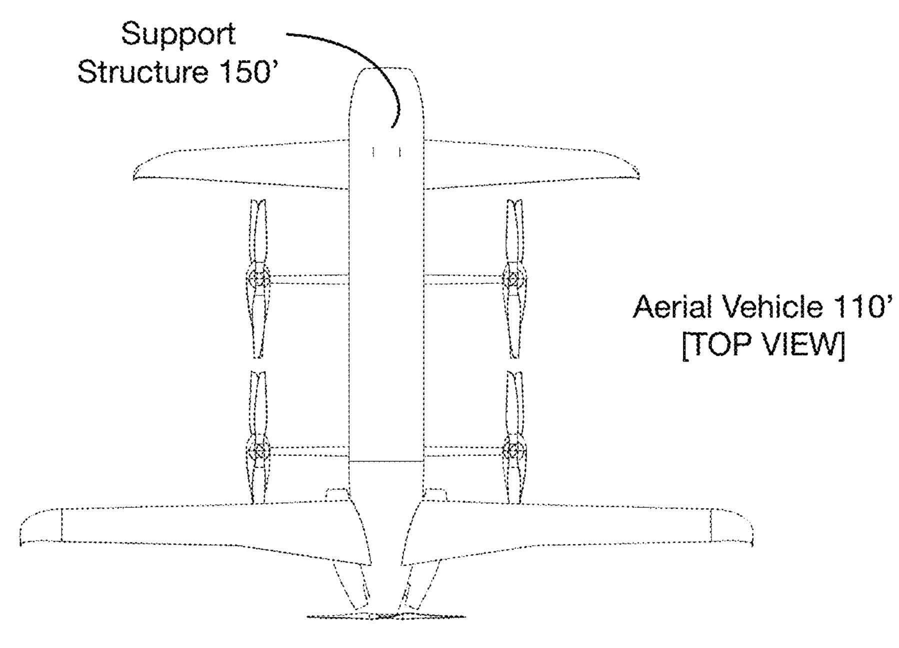

As shown in FIGS. 1A and 7, the storage region 140 can include a cargo bay 145 housed inside the fuselage 118 of the aerial vehicle 110 and supported by the support structure 150 described in more detail below.

The storage region 140 can also include a cargo bay fairing 147 that is able to be positioned over the cargo bay 145, where the cargo bay fairing 147 encloses the cargo bay in a manner that is flush or otherwise provides suitable aerodynamic behavior in relation to the fuselage 118 of the aerial vehicle. The cargo bay fairing 147 functions to reduce aerodynamic drag during forward flight of the aerial vehicle, and to support attachment of the nose portion of the aerial vehicle 110, in relation to mechanisms described above for the open configuration and the closed configuration of the nose portion 115. The nose portion 115 and/or cargo bay fairing 147 can, however, be optional elements and omitted in some embodiments, variations, and examples of the aerial vehicle 110, as they are not required for structural reasons. Omission of the nose portion 115 and/or cargo bay fairing 147 can support reception and/or transport of oversize cargo/payloads.

The storage region 140 can have a substantially planar floor to facilitate reception of packages. In relation to reception of packages, the floor can include elements (e.g., rails, tracks, rollers, a belt, etc.) that facilitate sliding of packages into the storage region 140, during package loading onto the aerial vehicle 110. Additionally or alternatively, the floor of the storage region 140 can have a terminal portion (e.g., entry region close to the nose portion) that can align with a ground handling system. Additionally or alternatively, the storage region 140 can include a subsystem for package relocation, for moving/relocating one or more packages after initial loading of the one or more packages onto the aerial vehicle 110.

In relation to FIG. 1B, a conveying subsystem 190' can be provided for loading and/or unloading of packages to and/or from the storage region 140 of the aerial vehicle 110. In particular, the conveying subsystem 190' provides mechanisms for autonomously transferring payload to and from the storage region 140, autonomously positioning cargo to meet weight and balance criteria, and autonomously securing payloads for flight operations and/or other operations. In combination with the conveying subsystem 190', which may or may not be external to or disparate from the aerial vehicle, the storage region 140 can support ground handling of packages, with respect to loading and/or unloading of packages from the storage region 140.

In one embodiment, a floor region of the cargo bay of the aerial vehicle 110 can include structural mechanisms operable for sliding packages inward and/or outward. During use, a user can position a package at a lip region 90' of the nose of the aerial vehicle 140 (e.g., with the nose in the open mode) and tracks of the mechanisms of the conveying subsystem 190' are configured to slide such packages inward and/or outward. The described ground floor system of the storage region 140 can include equipment with actuators to move packages in and out, receive feedback from weight sensors (e.g., at wheels of the aerial vehicle 110, at other ground contact points of the aerial vehicle 110, etc.) to position the package in order to achieve weight and balance, and to retain packages in position. In variations, the described tasks can be achieved autonomously, semi-autonomously, or non-autonomously.

In relation to maintaining positions of the one or more packages at desired locations of the storage region 140, the aerial vehicle 110 can include one or more retention elements configured to prevent individual packages or groups of packages from moving away from a desired position.

In some variations, one or more regions of (e.g., subregions of, entirety of) the storage region 140 can include shielding components configured to protect contents of the package(s) and/or to prevent characteristics of the package(s) from affecting operation of the aerial vehicle. In variations, the shielding can be composed of a material, with suitable morphological characteristics, that provides a barrier against one or more of: thermal energy, electromagnetic energy, chemical energy, radiant energy, nuclear energy, motion (e.g., as a dampener) and any other suitable type of energy. The shielding components can be configured as one or more shells configured to house one or more packages, or can alternatively be configured in another suitable manner.

Additionally or alternatively, in some variations, one or more regions of (e.g., sub-regions of, entirety of) the storage region 140 can include isolated environments with cooling and/or heating subsystems, in order to provide temperature-controlled environments as appropriate for transport of one or more packages. In one variation, one or more subregions of the storage region 140 can provide cold storage for maintaining one or more packages in a refrigerated or frozen state. Additionally or alternatively, in another variation, one or more subregions of the storage region 140 can maintain one or more packages at room temperature or below a threshold temperature. The heating/cooling subsystems can be configured to account for ambient temperatures outside the aerial vehicle 110 and/or within the storage region 120 at altitude, in order to maintain or take advantage of heating/cooling provided by the environment at various altitudes of flight operations.

In related embodiments, one or more regions of (e.g., sub-regions of, entirety of) the storage region 140 can include isolated environments for controlling pressure and/or moisture surrounding one or more packages. As such, the storage region 140 can, in some variations, be subdivided into multiple compartments to provide suitable environments for different types of packages.

In some variations, the storage region 140 can include one or more alternative access openings (e.g., aside from the open position of the nose region 115), in order to allow unloading and/or loading of packages from the aerial vehicle 110 (e.g., from a belly region of the aerial vehicle 110, from above the aerial vehicle, such as when the cargo bay fairing 147 is not present, etc.).

While the storage region 140 is described above as internal to the aerial vehicle 110, in variations, the storage region 140 can additionally or alternatively include sites external to the aerial vehicle 110. For instance, in some variations, the aerial vehicle 110 can include external structures (e.g., hard points) to which packages can be reversibly coupled. The external structures can extend from the outermost portion (e.g., skin) of the aerial vehicle, or can additionally or alternatively pass through the outermost portion and extend from an internal frame of the aerial vehicle 110, in order to provide robust sites for package loading. In variations, the external structures are positioned near the CG of the aerial vehicle 120 (e.g., near wing roots, from the belly, at a dorsal surface, etc.) in order to reduce risk of undesired behavior in stationary or flight modes of the aerial vehicle. Additionally or alternatively, in variations, the external structures can be positioned contralaterally about the longitudinal axis of the aerial vehicle 110, in order to provide balance. Additionally or alternatively, the external structures can be positioned anywhere in a manner that does not adversely affect flight or stationary modes of the aerial vehicle 110 (e.g., in relation to stalling characteristics, in relation to maneuvering speeds, in relation to speeds associated with maximum loads, in relation to balance when stationary, etc.).

2.1.5 Aerial Vehicle—Directional Stability Element(s)

In variations, as noted above, the system 100/aerial vehicle 110 can further include structural features that provide improved directional stability (e.g., directional static stability, directional dynamic stability), in relation to yawing moments and side slip performance.

In variations, an example of which is shown in FIG. 3A-3E, such features can include one or more of: one or more vertical stabilizer elements, one or more ventral fin elements, other vertical or approximately vertical features positioned at the wing(s) (e.g., as winglets, as vertically-oriented surfaces positioned at trailing wing edges, etc.), and/or other structural features positioned at other flight or control surfaces of the aerial vehicle 110.

Such structural elements can be configured with various morphological aspects to provide desired directional stability characteristics, where morphological aspects can include: area (e.g., vertical stabilizer area, winglet area, fuselage side area, etc.), positioning (e.g., relative positions between wing elements, such as the forward wing 120 and the aft wing 130, relative positions of wing elements along the fuselage, relative positions of wing elements in relation to center of gravity considerations, etc.), wing sweep angle of the forward wing 120, wing sweep angle of the aft wing 130, and/or other morphological aspects.

In variations, a vertical stabilizer can have a height that is up to 50% of the height of the fuselage of the aerial vehicle, up to 60% of the height of the fuselage of the aerial vehicle, up to 70% of the height of the fuselage of the aerial vehicle, up to 80% of the height of the fuselage of the aerial vehicle, up to 90% of the height of the fuselage of the aerial vehicle, up to 100% of the height of the fuselage of the aerial vehicle, up to 110% of the height of the fuselage of the aerial vehicle, or of another suitable height and surface area that provides directional stability. The vertical stabilizer(s) can be positioned at an aft portion of the aerial vehicle or another suitable location.

In variations, a ventral fin (or other fin) can have a height that is up to 10% of the height of the fuselage of the aerial vehicle, up to 20% of the height of the fuselage of the aerial vehicle, up to 30% of the height of the fuselage of the aerial vehicle, up to 40% of the height of the fuselage of the aerial vehicle, or of another suitable height and surface area that provides directional stability and provides suitable ground clearance. The ventral fin(s) can be positioned at an aft portion of the aerial vehicle or another suitable location.

In variations, a winglet can have a height that is up to 20% of the height of the aerial vehicle, up to 30% of the height of the aerial vehicle, up to 40% of the height of the aerial vehicle, up to 50% of the height of the fuselage of the aerial vehicle, up to 60% of the height of the fuselage of the aerial vehicle, up to 70% of the height of the fuselage of the aerial vehicle, up to 80% of the height of the fuselage of the aerial vehicle, up to 90% of the height of the fuselage of the aerial vehicle, up to 100% of the height of the fuselage of the aerial vehicle, up to 110% of the height of the fuselage of the aerial vehicle, or of another suitable height and surface area that provides directional stability.

In variations, one or more of the forward wing 120 and the aft wing 130 (or other variations, such as forward wings 120', 120", 120'" and aft wings 130', 130", 130'", etc.) can be swept back at an angle (e.g., 2 degree angle, 5 degree angle, 7 degree angle, 10 degree angle, 20 degree angle, 30 degree angle, other angle values, other intermediate angle values with respect to those described, etc.).

In variations, aerial vehicle structural features can include aspects designed to reduce or minimize downwash from the forward wing 120, and/or other aerodynamic design aspects that could affect directional stability.

In the specific example shown in FIGS. 3A-3E, the aerial vehicle 110''' includes a forward wing 120''' and aft wing 130''' with winglets 132''', as well as vertical stabilizer 80''' and ventral fin 90''' for providing directional stability. In the example shown in FIGS. 3A-3E, the vertical stabilizer 80''' and ventral fin 90''' are positioned at an aft portion of the aerial vehicle 110'''.

Directional stability improvements can be 40% better, 50% better, 60% better, 70% better, 80% better, 90% better, 100% better, 120% better, 130% better, 140% better, 150% better, 160% better, or better, in relation to variations of the aerial vehicle that omit structural features (e.g., vertical stabilizer, ventral fin, wing sweep angle, winglets, etc.) that provide improved directional stability.

2.2 System—Aerial Vehicle Support Structures and Powered Lift Devices

As shown in FIG. 1A (bottom) and FIGS. 1C-1G, the aerial vehicle 110 includes a support structure 150 positioned near a ventral side of the fuselage 118, where the support structure 150 comprises a platform that can function to support carrying of loads (e.g., payloads, aerodynamic loading during operations of the aerial vehicle 110), and to serve as attachment points for the first set of powered lift devices 160 described in more detail below. The support structure 150 can additionally serve as an attachment point for the forward wing 120 described above. The support structure 150 can be configured to carry/support all loads associated with the aerial vehicle and provides coupling points for the array of powered lift devices, the forward thrust generating devices, the forward wing, and the aft wing.

In variations, the support structure 150 can include a frame/platform (or extend laterally from a structural frame/platform internal to the aerial vehicle 110). The frame of the support structure 150 can comprise arms 151 that extend laterally from the fuselage 118, in order to provide attachment points for the first set of powered lift devices 160. In examples, the arms 151 can be coupled to or extend from the platform within the aerial vehicle 110, provide attachment points for the first set of powered lift devices 160 external to the aerial vehicle, with suitable clearance of moving portions of the set of powered lift devices 160 from the fuselage 118 or other portions of the aerial vehicle. The support structure 150 can, however, be otherwise configured.

A specific example of the support structure 150' and arms 151' is shown in FIGS. 8A-8E.

In some variations, the support structure 150 can include one or more sensor units that function to provide detect-and-avoid functions, in relation to detection and avoidance of other objects in the air and/or on the ground, for various flight operation modes. Such sensor units can support autonomous flight operation modes described, and/or be used to provide notifications to operators or other entities in relation to non-autonomous flight operation modes. In variations, sensor units can include one or more of radar sensor units, LIDAR sensor units, optical sensor units, infrared radiation sensor units, ADS-B systems, and/or other units configured to support detect-and-avoid operation modes. In variations, the sensor unit(s) can be positioned at a forward portion, lateral portion(s), and/or aft portion of the aerial vehicle 110 along the support structure 150. In a specific example, the sensor unit(s) can be positioned at a forward portion of the aerial vehicle 110, under the nose portion 115 of the aerial vehicle (e.g., at a forward portion of the support structure 150 under the aerial vehicle).

Figures 1E, 1F, 1G:
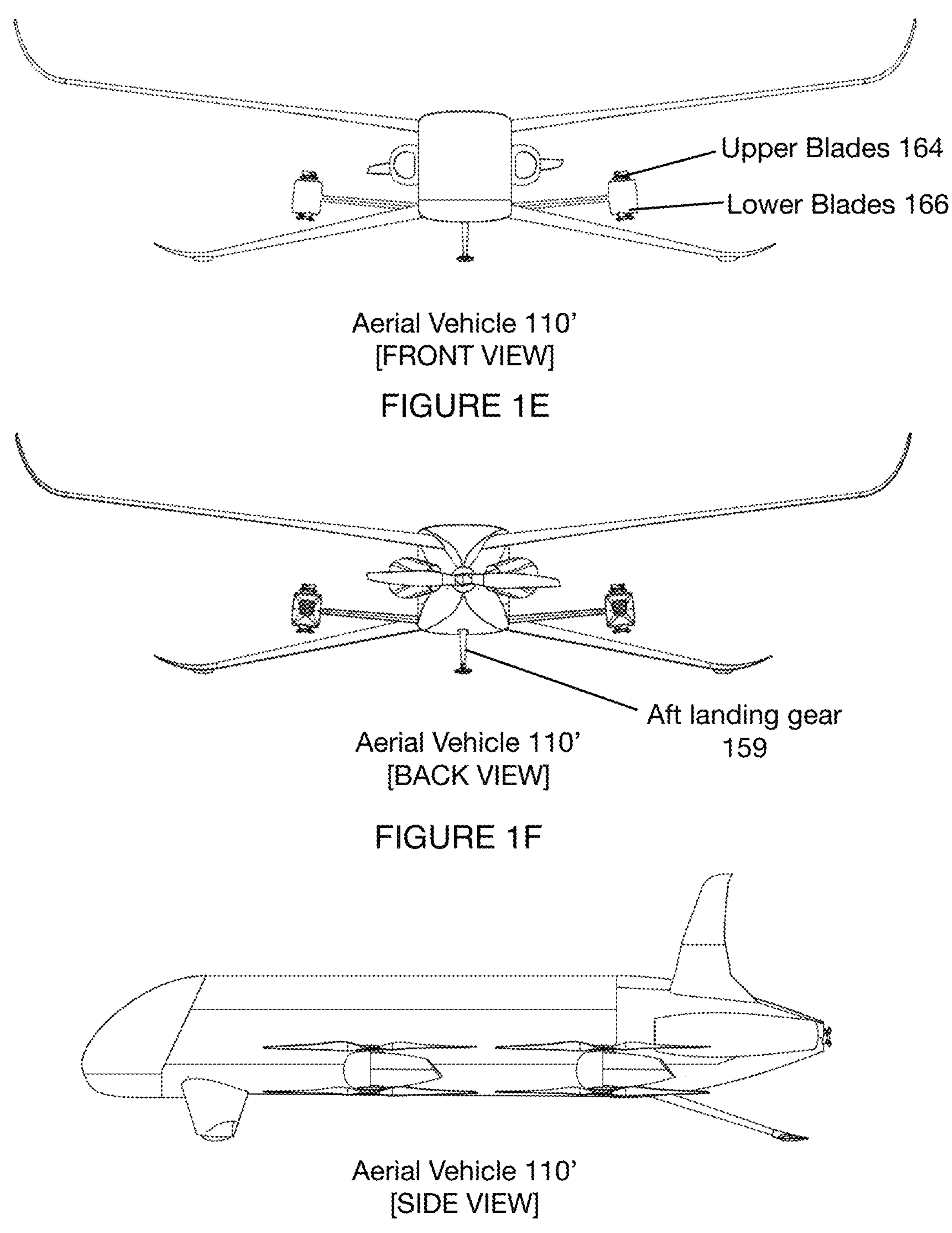
Figure 1H:
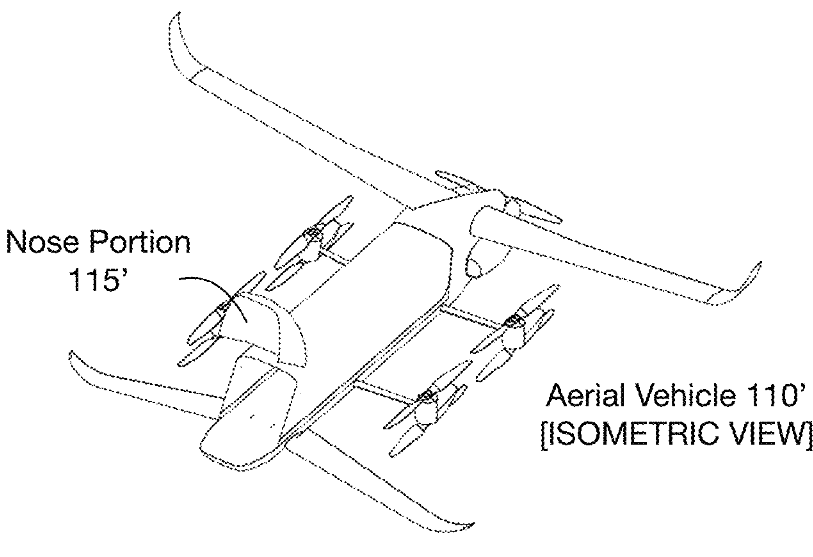
FIGS. 1H-1L depict views of a specific example of a system for payload transportation, where the nose of the system is in an open configuration.
Figure 1I:
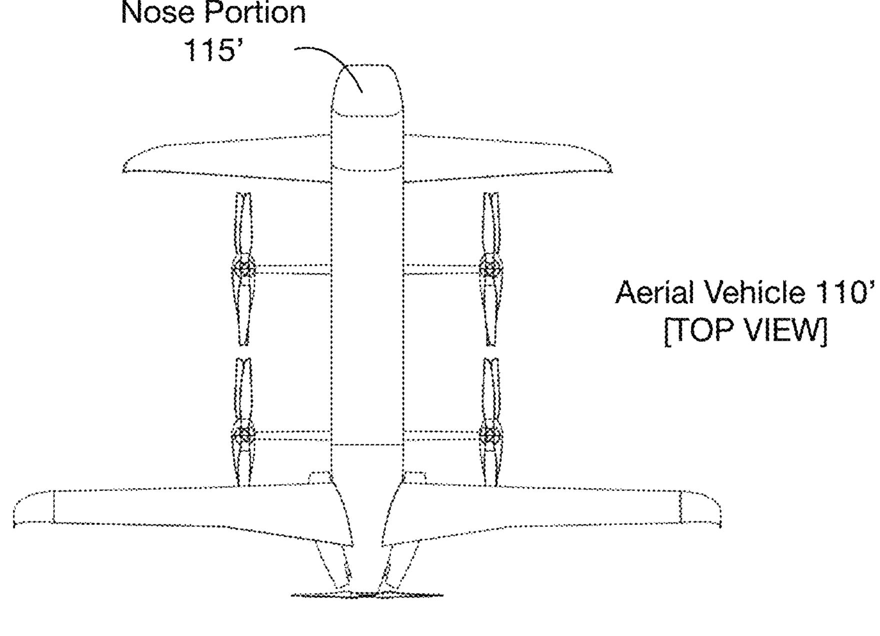
Figure 1J:
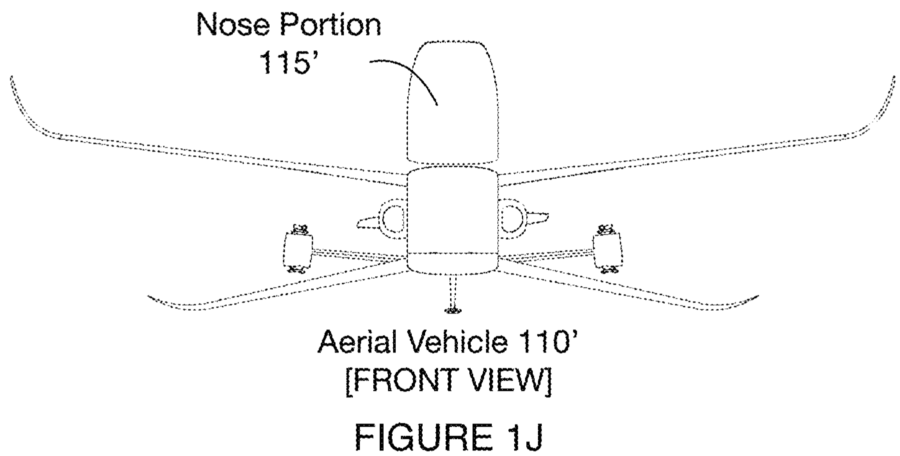
Figure 1K:
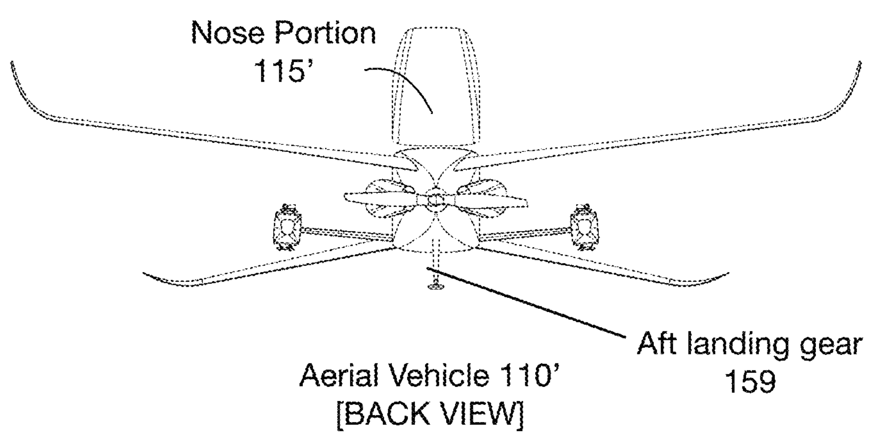
Figure 1L:
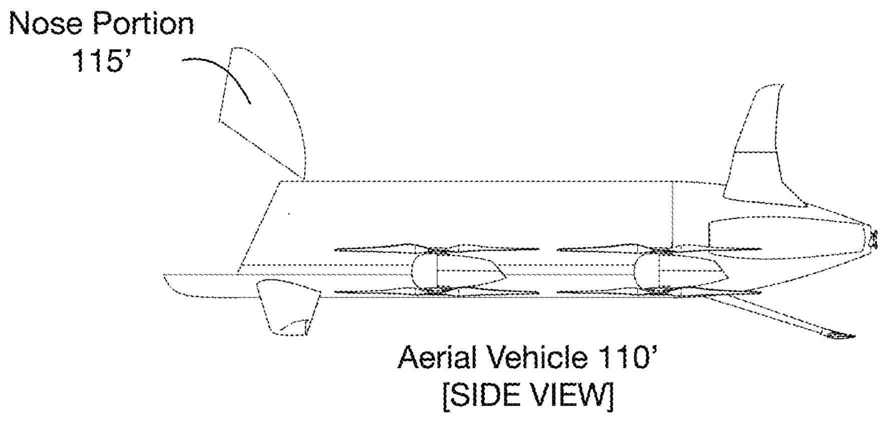
Figure 2A:
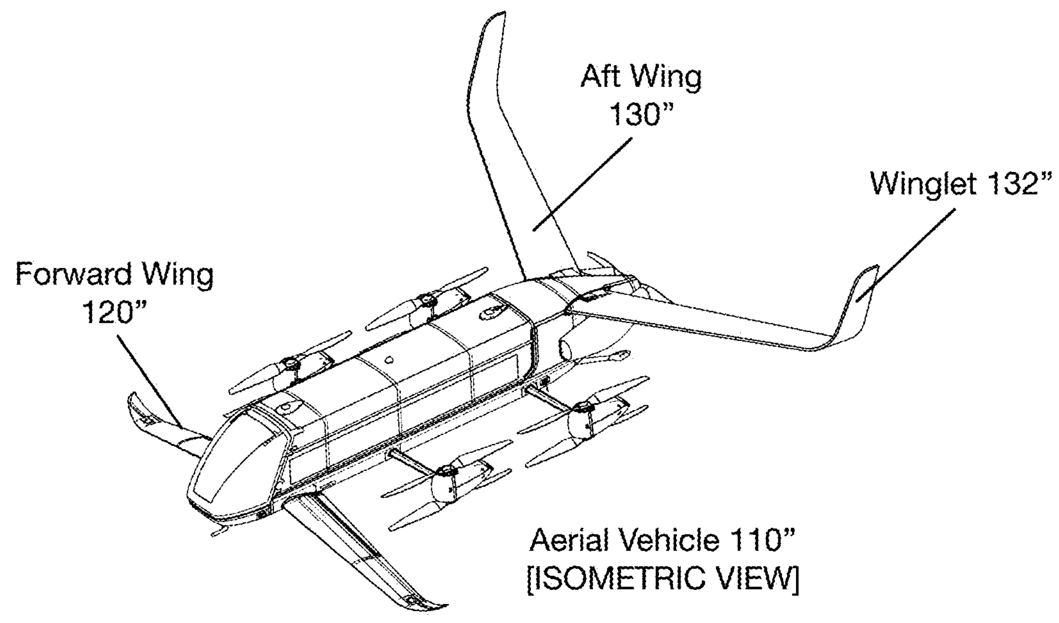
FIGS. 2A-2E depict views of another specific example of a system for payload transportation.
Figure 2B:
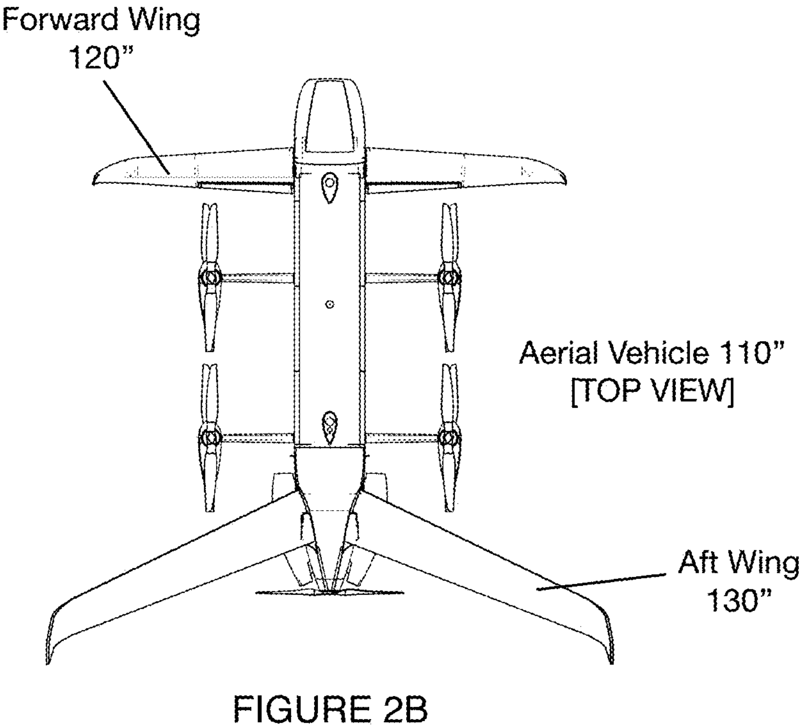
Figure 2C:
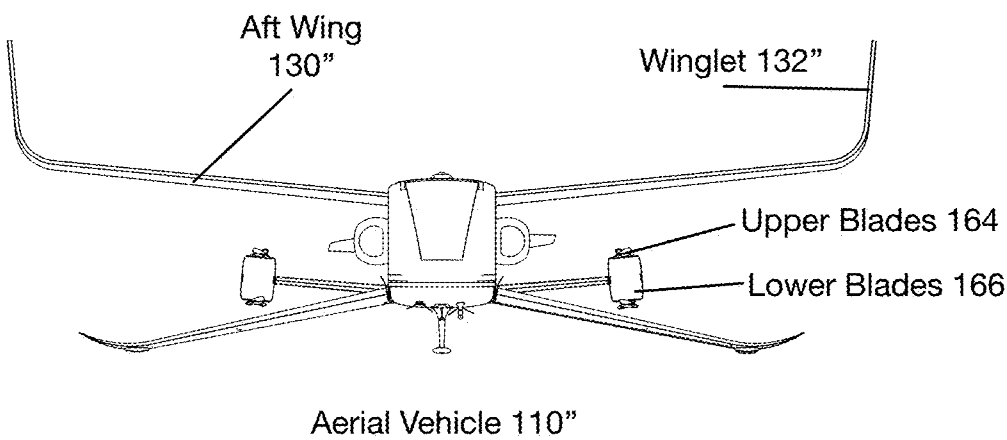
Figure 2D:
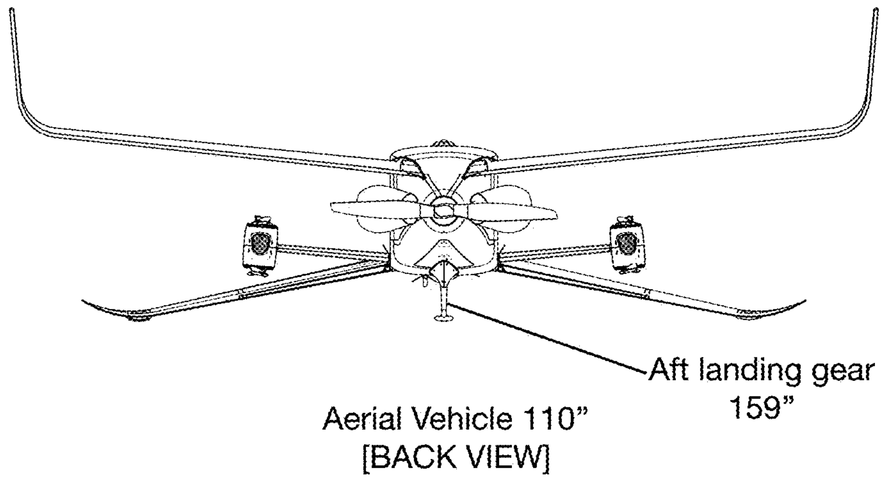
Figure 2E:
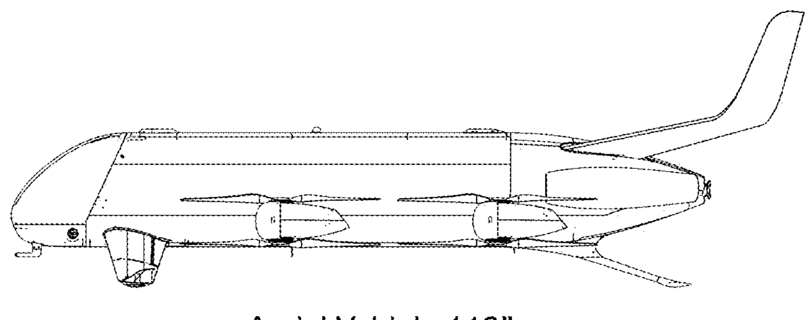
Figure 3A:
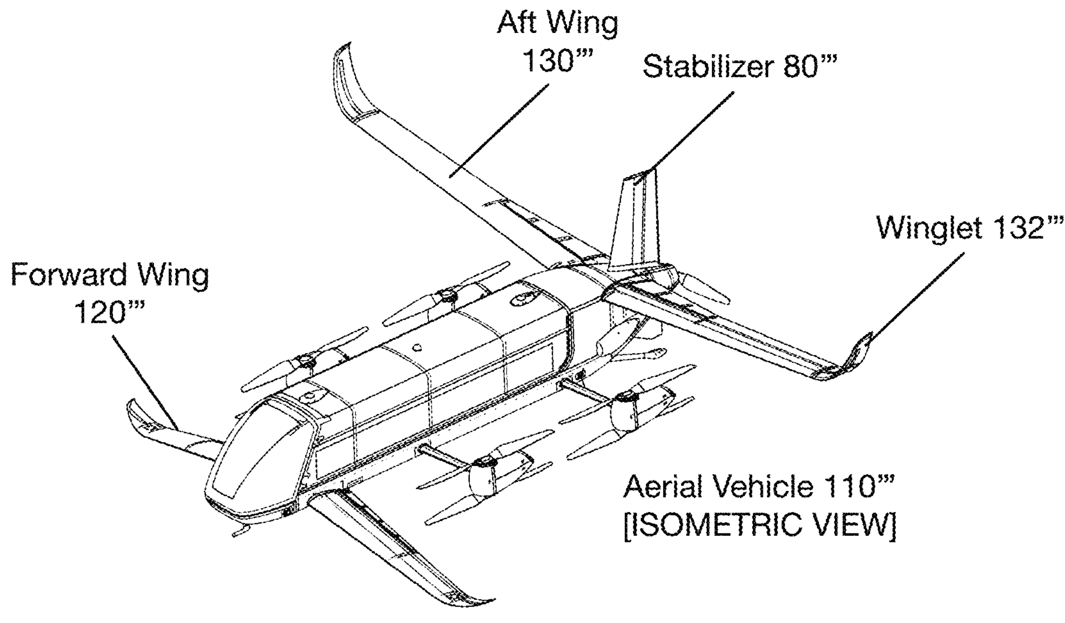
FIGS. 3A-3E depict views of another specific example of a system for payload transportation.
Figure 3B:
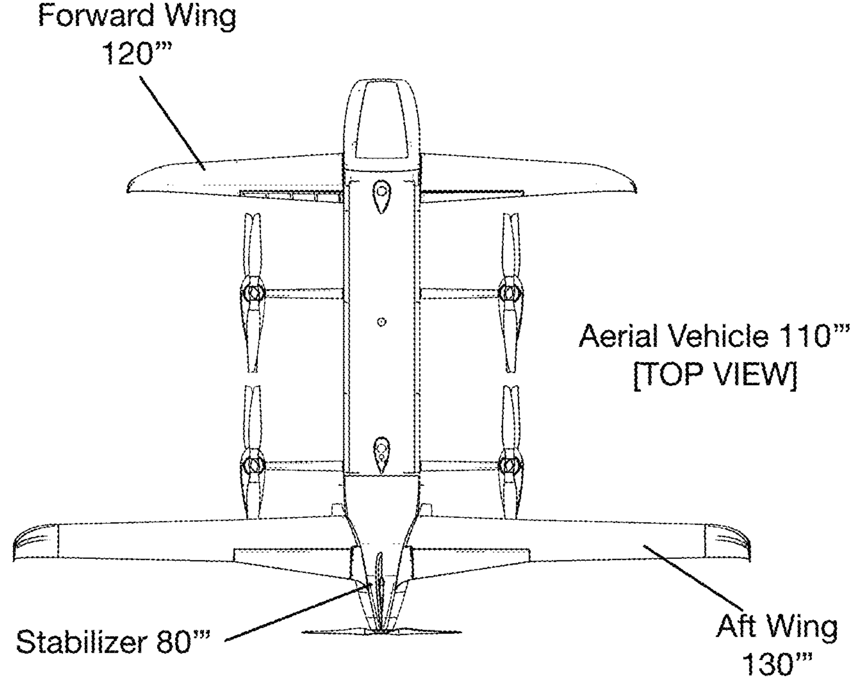
Figure 3C:
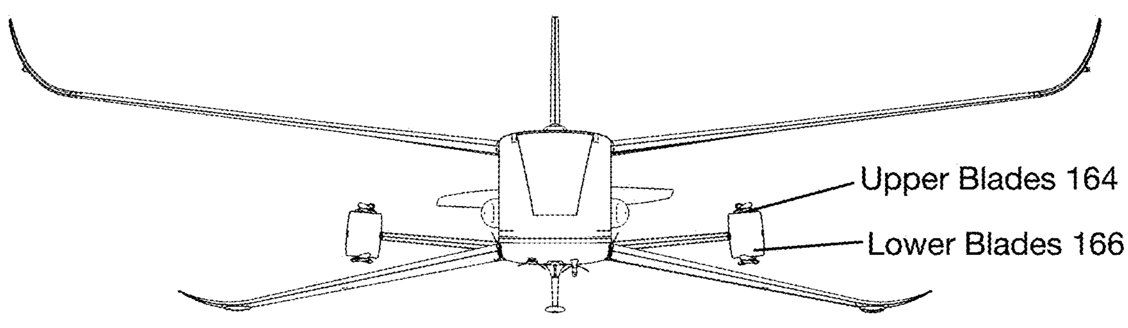
Figure 3D:
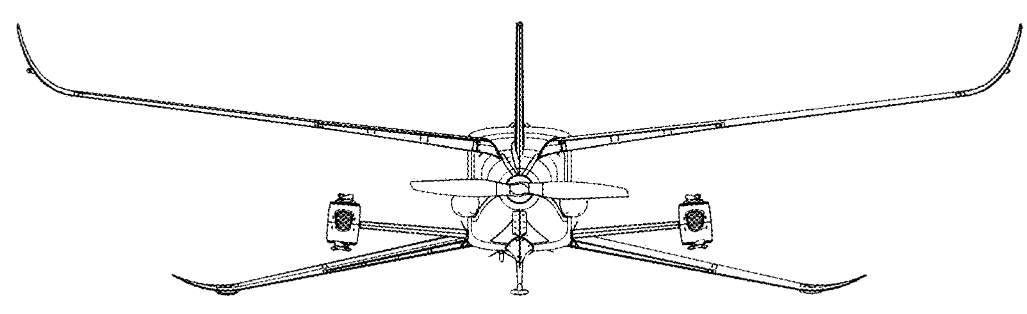
Figure 3E:
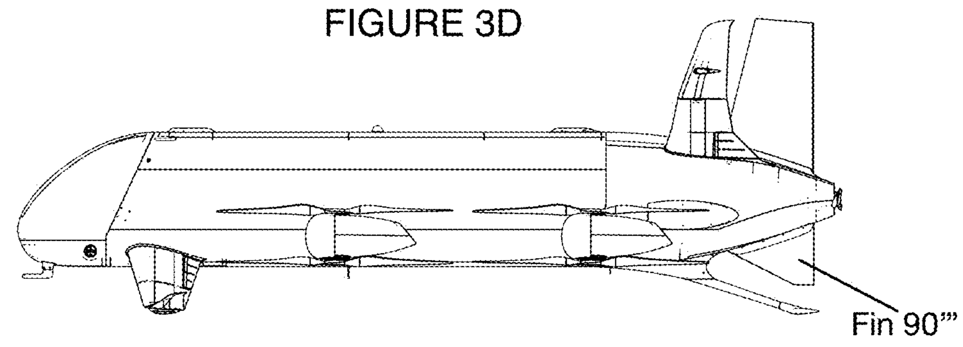

As shown in FIG. 1E, the aerial vehicle 110 can also include an aft landing gear 159, which functions, with the forward wing landing elements described above, to enable the aerial vehicle 110 to land at a landing site, takeoff from a takeoff site, allow the aerial vehicle 110 to receive packages from, and/or align the aerial vehicle 110 with the conveying subsystem 150 described in more detail below.

The aft landing gear 159 can be positioned at an aft portion of the aerial vehicle, to provide stability in relation to contralateral landing features provided at the forward wing 120. An aft-positioned landing support structure 159 can also function to protect any aft-positioned thrust devices from ground strike during landing operations or other operations. In variations, the landing support structure 159 can include one or more of: a strut, skids, wheels (e.g., in order to enable or support ground taxiing operations), skis, and/or any other suitable landing element. Variations of the landing support structure 159 can further include fixed components and/or retractable components (e.g., in order to improve performance in flight operation modes, etc.). In an example, the landing support structure 159 can include a tail gear strut, positioned at an aft region of the fuselage of the aerial vehicle, the tail gear strut configured to provide a ground contact point and protect the forward thrust generating device from ground strike during operations of the aerial vehicle.

The aft landing gear 159 can include one or more load sensors, that operate, with load sensors of other portions of the aerial vehicle 110 (e.g., of the forward wing 120 described above), to enable determination of ground reaction forces and determination of CG of the aerial vehicle dynamically (e.g., during various operation modes of the aerial vehicle 110, during changes in loading configurations of the aerial vehicle due to payload changes, fuel changes, battery configuration changes, etc.). Such sensors can thus form an integral subsystem comprising a set of weight sensing devices that measure and report vertical ground reaction forces acting on the aerial vehicle 110. A housing of the integral subsystem can further be provided such that application of non-vertical loads to the aerial vehicle does not interfere with accurate measurement of said vertical ground reaction forces. The set of weight sensing devices described report signals informative of innately redundant and flight critical binary loaded or unloaded statuses of the aerial vehicle, as well as scalar results. Such information can also be used to guide load balancing operations of the aerial vehicle 110.

The described support elements for landing, landed, taxing, and/or other ground operation modes can be configured to land on hard terrain (e.g., paved terrain, grass terrain, dirt terrain, etc.). Such elements can thus include features (e.g., springs, dampening elements, etc.) configured to reduce forces (e.g., G-forces) experienced by the aerial vehicle 110 upon/during landing. Additionally or alternatively, the described support elements can be configured to land on non-hard terrain (e.g., soft surfaces, water, etc.). The described support elements can be configured to land on, takeoff from, and operate on substantially flat surfaces, or can additionally or alternatively be configured to land on, takeoff from, and operate on non-planar surfaces and/or moving surfaces (e.g., of an air carrier, of a vehicle configured to travel over water, of a vehicle configured to travel on land, of a vehicle configured to travel by air, etc.). For instance, one or more portions of the landing support elements can include one or more actuators configured to level the aerial vehicle 110 or otherwise align a portion (e.g., storage region 140) of the aerial vehicle 110 with a conveying subsystem 190 component to reduce potential for issues during package loading or unloading.

As such, in variations, described support elements for landing, landed, taxing, and/or other ground operation modes can have multiple supports (e.g., three supports, four supports, greater than four supports, fewer than three supports, etc.), in order to provide stability during ground-based operations. Each support can be individually controllable (e.g., in variations wherein the landing support subsystem 130 is configured to land on non-planar surfaces); however, in other variations, each support may not be individually controllable (e.g., as in all-retract and all-extend gear systems).

The described support elements for landing, landed, taxing, and/or other ground operation modes are preferably further configured in a manner that does not obstruct loading of packages onto or unloading of packages from the aerial vehicle. As such, the elements described are preferably positioned away from the opening(s) of the nose portion 115 of the aerial vehicle, and/or any other access sites.

2.2.1 Aerial Vehicle—Powered Lift Devices

As shown in FIGS. 1A and 1B, the first set of powered lift devices 160 function to, with other power plant aspects (e.g., hybrid or other aspects described), provide thrust for takeoff, hover, landing, fixed-wing operations, transitions between VTOL and fixed-wing or other operation modes, and/or other flight and ground operations. As such, the first set of powered lift devices 160 can be configured to generate vertical thrust, mostly vertical thrust, and/or thrust along other suitable vectors defined relative to reference axes of the aerial vehicle 120. In variations, the first set of powered lift devices 160 is coupled to attachment points (e.g., contralateral points) on the support structure 150 described above. Powered lift devices of the array of powered lift devices are configured with dihedral to provide roll stability during vertical propulsion and/or other vertical phases of flight. Vertical separation provides a means for avoiding wakes with respect to transitions between vertical and forward flight, vertical flight, and forward flight.

The configuration of the support structure 150 and the powered lift devices 160 functions to provide a more efficient load path, provide a stiffer structure (important for controls), reduce electrical cable run length, to provide aerial vehicle weight savings in addition to manufacturing simplifications/savings. In contrast, other configurations of aerial vehicles 110 mount vertical propulsion units to wings, which can create wing bending and torsional loading during motor-out load cases, and such configurations require a conventional wing to be significantly reinforced. Another main advantage of the configuration of the support structure 150 and the powered lift devices 160 involves reducing the effects of the rotor on the wings, especially during transitions between forward flight and vertical flight, where transitions in flight modes are most challenging due to non-linearities.

Each powered lift device of an array of powered lift devices 160 can be coupled to the fuselage between the forward wing and the aft wing, by way of the support structure 150.

In variations, each of the first set of powered lift devices 160 can be configured with dihedral, in order to provide roll stability during vertical propulsion, and to structure the first set of powered lift devices 160 to avoid the wake of the forward wing during transitions between VTOL and forward flight operation modes. The dihedral orientation(s) of the first set of powered lift devices 160 can be fixed (e.g., based upon angle at which each powered lift device is attached to the support structure 150).

The angle of dihedral for individual or each powered lift device of the first set of powered lift devices 160 can be 1 degree, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees, 24 degrees, 25 degrees, an intermediate angle, or another suitable angle relative to a horizontal plane.

Each of the first set of powered lift devices 160 is preferably individually controllable, in order to provide fine control of behavior of the aerial vehicle 110 on the ground and/or in flight. Alternatively, one or more subsets of the first set of powered lift devices 160 can have controls coupled with other powered lift devices of the first set of powered lift devices 160.

Each of the first set of powered lift devices 160 can include one or more blades coupled to a shaft coupled (e.g., directly, indirectly, by one or more gearboxes, clutches, joints, etc.) to the power plant(s) (e.g., motor components) of the aerial vehicle 110. The one or more blades can be configured as a propeller or other rotating airfoil, that converts energy to generate thrust. The power plant(s) can drive rotational motion of the blade(s) of different powered lift devices in counterclockwise and/or clockwise modes (e.g., to provide balanced characteristics in relation to angular momentum, etc.), depending on intended flight behavior. In operation, each blade can be fixed in pitch, or can alternatively be adjustable in pitch, in order to allow the propeller to operate in more efficient orientations and change desired thrust characteristics. The blades can be constructed of a synthetic material and/or a natural material, and in variations, can be composed of one or more of (e.g., single material or composite material): a polymer, a metal, a wood-derived material, or another suitable material. The material(s) of the blade(s) is/are preferably non-brittle and have suitable mechanical and thermal properties appropriate to intended flight environments.

In variations, each thrust-generating device can include multiple blades (e.g., two blades, three blades, four blades, five blades, more than five blades). The multiple blades of a thrust-generating device can be distributed radially and symmetrically about its respective shaft. Each blade can be identical to the other blades, or can alternatively be non-identical to at least one other blade (e.g. in surface area, in cross section, in other morphological or material aspects). For instance, in some variations, a first blade or subset of blades can have a first morphology (e.g., a first width, a first length, a first surface area, a first cross sectional profile, etc.) and a second blade or subset of blades can have a second morphology (e.g., a second width, a second length, a second surface area, a second cross sectional profile, etc.). The first morphology and the second morphology can function to provide desired airflow characteristics, in relation to drag and induced turbulence (e.g., to reduce audible noise associated with spinning blades). The masses of the blade(s) of a powered lift device can be configured to have a resultant center of gravity aligned with the shaft, or can alternatively be configured in another manner. Furthermore, in relation to forward thrust, vertical thrust, and/or thrust along another suitable axis, each powered lift device can have its own configuration of blades optimized for providing thrust in one or more specific directions.

In variations, a specific example of which is shown in FIGS. 1C-1G, the first set of powered lift devices includes a set of motors supporting a subset of upper propellers 164 (e.g., two-bladed propellers) positioned at an upper (e.g., superior) side of the support structure 150, as well as a subset of lower propellers 166 (e.g., two-bladed propellers) positioned at a lower (e.g., inferior) side of the support structure 150. In the example shown in FIG. 1E, the subset of upper propellers 164 includes four propellers, and the subset of lower propellers 166 includes four propellers opposing the subset of upper propellers across the support structure 150.

However, in other variations, the set of powered lift devices can include another suitable number of propellers supported by other suitable numbers of motor components supporting the set of propellers. As such, the first set of powered lift devices 160 can include other suitable numbers of powered lift devices (e.g., 1 powered lift device, 2 powered lift devices, 3 powered lift devices, 4 powered lift devices, 5 powered lift devices, 6 powered lift devices, 7 powered lift devices, 8 powered lift devices, 9 powered lift devices, 10 powered lift devices, etc.). The first set of powered lift devices 160 can be symmetrically distributed about a longitudinal axis of the aerial vehicle 110; however, in other variations, the first set of powered lift devices 160 can be otherwise distributed and configured relative to the aerial vehicle 110.

As shown in FIGS. 1A and 1B, the aerial vehicle 110 can include a forward powered lift device 170 coupled to the fuselage 118. The forward powered lift device 170 functions to provide thrust along one or more vectors (e.g., for forward flight operation modes) different from thrust vectors of the first set of powered lift devices 160. As shown in FIGS. 1A-1G, the forward powered lift device 170 can be positioned at a portion of the aircraft aft of the CG, in order to position moving blades away from loading and/or unloading positions of the aerial vehicle 110, for safety purposes. As such, in a specific example, the forward powered lift device 170 can be positioned at a tail region of the aerial vehicle.

In variations, the aerial vehicle 110 can include more than one forward powered lift devices coupled to other portions of the aerial vehicle (e.g., contralaterally, extending from the aerial vehicle 110 near the leading edge of each wing, extending from the aerial vehicle 110 near the trailing edge of each wing, near the nose portion, etc.). Furthermore, in relation to a hybrid system, the forward powered lift device(s) 170 can provide thrust, while other power plant aspects (e.g., engines) can additionally be used for thrust (e.g., via a planetary gearbox) in addition to for other purposes (e.g., recharging batteries, etc.) via power take-off devices (e.g., electric motors).

In variations, powered lift devices described can be optionally decoupled from the power plant by way of a clutch, transmission, gearbox, or other system. This can useful when starting the power plant, when using the power plant purely to drive an onboard generator and/or when if the ability to operate the power plant in a way that is decoupled from thrust generation (e.g., starting, idling, warming, testing and diagnostics, safety, etc.) is desired. It may also be beneficial to disconnect the power plant if it has failed and an alternative power plant (e.g., electric motor) is then used to power the powered lift devices 140.

Furthermore, in variations, powered lift devices described can be configured for failsafe operation modes (e.g., with component redundancy), such that the aerial vehicle 110 can still fly and/or land safely in the event of a failure of one or more components (e.g., motors, propellers, batteries, etc.).

In variations, moving portions (e.g., blades) of powered lift devices described can be surrounded by a cage or other shield (e.g., duct), in order to prevent entities from contacting the moving portions, while still allowing the powered lift devices to provide suitable thrust for operation. However, variations of the powered lift devices can alternatively omit a cage or other shield.

2.3 System—Payload Management, Loading, Transport, and Unloading

As shown in FIG. 1B, the storage region 140 can support ground handling of packages, with respect to loading and/or unloading of packages from the storage region 140. In one embodiment, a floor region of the cargo bay of the aerial vehicle 110 can include structural mechanisms, such as conveying subsystem 190', operable for sliding packages inward and/or outward. During use, a user can position a package at a lip region of the nose of the aerial vehicle 140 (e.g., with the nose in the open mode) and tracks of the mechanisms are configured to slide such packages inward and/or outward. The described ground floor system of the storage region 140 can include equipment with actuators to move packages in and out, receive feedback from weight sensors (e.g., at wheels of the aerial vehicle 110, at other ground contact points of the aerial vehicle 110, etc.) to position the package in order to achieve weight and balance, and to retain packages in position. In variations, the described tasks can be achieved autonomously, semi-autonomously, or non-autonomously.

As shown in FIG. 1A, the system 100 also includes a conveying subsystem 190, which functions to facilitate pre-loading of packages and/or loading of packages onto the aerial vehicle 110, and/or to stage the set of packages and interface with the aerial vehicle 110. The conveying subsystem 190 thus functions to enable loading and unloading of payloads into the storage region 140 described, position the payload(s) into required positions for suitable aircraft weight and balance considerations, and/or to secure payloads in place for transport operations.

During operation, the conveying subsystem 190 is configured to interface with the nose portion 115 of the aerial vehicle 110 in the open position (or without the cargo bay fairing or nose portion of the aerial vehicle 110 in place), in order to facilitate transfer of packages from the conveying subsystem 190 and onto the aerial vehicle in a robust and reliable manner.

In the embodiment shown in FIG. 1A, the conveying subsystem 190 can include a moveable support 192 and a conveyer 194 supported by the moveable support 192, where the moveable support 192 positions and/or elevates the conveyer 194 into alignment with the floor of the storage region 140, such that packages can be transferred from the conveyer 194 to the storage region 140. However, as described above, alignment can additionally or alternatively be enabled by landing support elements. As described above, the conveyer 194 of the conveying subsystem 190 can be configured to form a substantially continuous surface with the floor of the storage region 140 during loading of the aerial vehicle 120, when the conveying subsystem 190 interfaces with the aerial vehicle 110.

As shown in FIG. 1A, the moveable support 192 of the conveying subsystem 190 can include a set of legs with wheels (e.g., caster wheels) that allow the moveable support 192 to be positioned into alignment with the floor of the storage region 140 of the aerial vehicle 110 in the open position. In variations, the one or more of the legs of the moveable support 192 can be adjustable in height, in order to allow the conveyer 194 to align with the floor of the storage region 140 regardless of the terrain on which the aerial vehicle 110 and/or the moveable support 192 are situated during loading of packages from the conveyer 194 to the storage region 140. Alignment can be performed automatically (e.g., using optical sensors, using other sensors configured for matching of alignment markers) or manually. However, the legs of the moveable support 192 can alternatively be non-adjustable in height. In relation to coupling between the conveying subsystem 190 and the storage region 140/aerial vehicle 110, the system 100 can be configured to interface the conveying subsystem 190 with the aerial vehicle 110 prior to leveling and/or after levelling the conveying subsystem 190.

As shown in FIG. 1A, the conveyer 194 functions to transfer packages to the storage region 140. In a first variation, the conveyer 194 can include a set of rollers or wheels that transfer packages from the conveyer 194 to the storage region 140. Each of the set of rollers or wheels can be controlled individually, in order to provide a mechanism for controlling movement of individual packages on the conveyer 194 independently of other packages. In another variation, the conveyer 194 can include a belt for transferring packages from the conveying subsystem 190 to the storage region 140. Surfaces of the conveyer 194 can be textured or otherwise provide a high friction surface (e.g., with gripping material) in order to prevent slipping of packages. Transfer of packages from the conveyer 194 to the storage region 140 can be automatically controlled (e.g., in coordination with a controller that receives weight and balance data from the weight and balance detection subsystem 160 described below), where one or more packages that satisfy weight and balance requirements can be automatically transferred from the conveyer 194 to the storage region 140. Additionally or alternatively, operation of the conveyer 194 can at least partially be manually controlled (e.g., by an operator).

In relation to alignment with a floor of the storage region 140, a portion (e.g., forward facing portion) of the conveying subsystem 190 can include one or more alignment and/or locking features (e.g., protrusions, recesses, latches, magnetic components, etc.) for at least temporarily fixing the position of the conveyer 194 relative to the floor of the storage region 140. In these embodiments, the open position of the nose portion 115 can be configured to expose alignment and/or locking features that are complementary with those of the conveying subsystem 190.

The conveying subsystem 190 can include sensors coupled to the moveable support 192 and/or conveyer 194 of the conveying subsystem 190. Coupling of sensors to the conveying subsystem 190 can enable operation modes associated with pre-sorting of packages and optimizing configurations of packages prior to loading onto the aerial vehicle 110. In variations, the system 100 can be configured to pre-sort packages based on one or more of: individual weights and/or CGs of packages, global weights and/or CGs of a set of packages (e.g., a pallet), volumes of one or more packages, shapes of one or more packages, delivery sequences of packages, contents of packages (e.g., in relation to environmentally-constrained storage requirements), and/or other variables.

In relation to pre-sorting, the conveying subsystem 190 can include one or more feeders, which function to receive a subset of packages intended to be loaded onto the aerial vehicle 110, and to load them onto the conveyor 194 in a desired sequence associated with weight and balance considerations and/or other considerations.

Sensors associated with weight and balance can be used to readjust positions of one or more packages during operation, based on one or more of: unloading of one or more packages during delivery, pickup of one or more packages or other objects during a mission (e.g., along a delivery route with one or more delivery/pickup events), movement of packages during operation of the aerial vehicle, weight and balance requirements during various phases of operation (e.g., flight operations, ground operations) of the aerial vehicle, and other considerations.

The system 100 can additionally or alternatively include other elements configured to support operation of the aerial vehicle and its associated missions. For instance, the system 100 can include components for performing diagnostics, in relation to generating outputs regarding subsystem statuses (e.g., normal operation, abnormal operation, health reporting, etc.) and/or maintenance requirements for subsystems. Such support operations can be performed within visual line of sight or non-visual line of sight with the aerial vehicle 110 (e.g., by way of a connection to the cloud or in another suitable manner).

2.4 System—Operation Modes

As described above and shown in FIG. 4, embodiments of the system 100 can be configured to execute a set of operation modes including one or more of: a weight and balance detection mode 210, a package loading mode 220, a package transport mode 230 (e.g., configured for one or more of VTOL operations, fixed-wing operations, transitions between VTOL and fixed-wing operations, and other operations using the one or more thrust generation elements), and a package unloading mode 240. Each of the set of operation modes involves one or more structural configurations of the system, and the system 100 can transition between modes as needed, based on mission requirements. As such, the system 100 can include one or more processors comprising non-transitory media storing instructions that when executed by the one or more processors perform various operation modes.

In the weight and balance detection mode 210, sensing elements detects weight and balance characteristics (e.g., total weight, center of gravity, etc.) of one or more packages at either or any of the storage region 140. Based upon detected weight and balance characteristics, one or more processing components of the system 100 then return one or more outputs and/or execute one or more actions. In more detail, the weight and balance detection mode 210 can include a weight assessment operation mode 212 including architecture for generation of an analysis characterizing weight distribution of a set of packages, and a weight distribution operation mode 213 in which the set of packages is positioned and retained for proper weight and balance. Positioning can be performed automatically (e.g., with robotic apparatus configured to re-distribute individual packages in an optimized manner). However, positioning can alternatively be performed manually.

In variations, returned outputs associated with the analysis can be associated with one or more of: weight and balance characteristics within acceptable range, weight and balance characteristics outside of acceptable range, other analyses derived from weight and balance characteristics, reports indicating recommended loading configurations for a set of packages, computer readable instructions configured to be executed by controllers of the storage region 140 for loading and/or unloading of packages, computer readable instructions configured to be executed by controllers of the storage region 120 for positioning and/or repositioning of packages within the storage region 140 (e.g., as packages are loaded onto or unloaded from the storage region 140), and/or any other suitable outputs.

In variations, executed actions can include one or more of: controlling conveying elements of the portion (e.g., floor, level, overhead portion, etc.) of the storage region 140 for transfer of one or more packages to/from the storage region 140, repositioning of packages within the storage region 140 (e.g., as packages are loaded onto or unloaded from the storage region 140), preventing loading of packages onto the aerial vehicle 110 (e.g., if weight and balance characteristics are out of range), and/or any other suitable action.

The weight and balance detection mode 210 can be executed during pre-loading of packages, during loading of packages, during ground operations of the aerial vehicle 110, during flight operations of the aerial vehicle 110, during delivery operations of the aerial vehicle 110, and/or at any other suitable time.

In the package loading mode 220, the nose portion 115 of the aerial vehicle is transitioned to the open position (or omitted, with or without the cargo bay fairing described). In relation to the package loading mode 220, components at the floor of the storage region 140 can additionally or alternatively be configured to facilitate reception of packages (e.g., with conveying elements within the storage region 140). Additionally or alternatively, package positioning apparatus of the storage region 140 can be configured to re-position packages as needed. Additionally or alternatively, retention elements within the storage region can be configured to transition (e.g., extend outward, rotate outward, etc.) to a configuration for maintaining positions and/or preventing shifting of packages.

The package loading mode 220 can be executed post pre-loading of packages and at any time when the aerial vehicle 110 is intended to receive packages for storage or transport.

In the package transport mode 230, the nose portion 115 of the aerial vehicle is transitioned to the closed position, and the aerial vehicle 110 is transitioned into modes associated with ground movement and/or flight (e.g., VTOL operations, fixed-wing operations, transitions between VTOL and fixed-wing operations, etc.), for transport of one or more packages. In relation to the package transport mode 230, components of the storage region 140 can additionally or alternatively be configured to facilitate repositioning of packages (e.g., as packages are delivered, due to weight and balance changes of the aerial vehicle, due to operation modes of the aerial vehicle, etc.). In the package transport mode 230, retention elements within the storage region can be configured to maintain configurations for maintaining positions and/or preventing shifting of packages.

The package transport mode 230 can be executed subsequent to instances of the package loading mode 220 and at any time when the aerial vehicle 220 is intended to transport packages to a delivery or storage site.

In the package unloading mode 240, portions of the aerial vehicle 110 configured for unloading can be transitioned to open positions and/or package release modes, and one or more packages can be released from the storage region 140 of the aerial vehicle 110. In variations, one or more of the nose portion 115 and/or other access sites can be transitioned to open positions for allowing packages to be removed or transferred from the storage region 140. In the package unloading mode 240, retention elements within the storage region 140 can be configured to release packages, and/or maintaining positions for preventing shifting of packages that are still onboard the aerial vehicle 110.

The package unloading mode 240 can be executed in association with in-air delivery of one or more packages (e.g., in flight modes, in hover modes, etc.) and/or delivery of one or more packages when the aerial vehicle 110 is at a landing site and/or in contact with the ground.

Furthermore, in relation to the weight and balance detection mode 210, the one or more processors 200 can further include non-transitory media storing instructions that when executed by the one or more processors 200 perform a weight reassessment operation mode 214 when at least one selected package of the set of packages is delivered from the storage region 120, in coordination with the package unloading mode 240. In one such variation, in the weight reassessment operation mode 214, the set of packages can be unloaded from the storage region 140 onto the conveying subsystem (e.g., conveyer 194, etc.), and a selected package can be delivered to the recipient. Then, the system 100 can transition to the weight reassessment operation mode 214 for generation of an updated analysis characterizing remaining packages of the set of packages, and remaining packages of the set of packages are re-loaded into the storage region in an optimized manner.

The system 100 can, however, be configured to transition to other states, in order to execute other modes of operation.

3. CONCLUSIONS

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:

an aerial vehicle comprising:

a fuselage;

a storage region positioned longitudinally within the fuselage, the storage region configured for receiving and transporting a payload;

a forward wing mounted to the fuselage;

an aft wing mounted to the fuselage, wherein the forward wing and aft wing are configured to accommodate at least a 20% deviation in center of gravity associated with a payload of the aerial vehicle;

an array of powered lift devices, each powered lift device of the array of powered lift devices coupled to the fuselage between the forward wing and the aft wing;

a forward thrust generating device;

an integral subsystem comprising a set of weight sensing devices that measure and report vertical ground reaction forces acting on the aerial vehicle, wherein a housing of the integral subsystem is designed such that application of non-vertical loads to the aerial vehicle does not interfere with accurate measurement of said vertical ground reaction forces, and wherein the set of weight sensing devices report signals informative of innately redundant and flight critical binary loaded or unloaded statuses of the aerial vehicle; and a conveying subsystem configured to autonomously transfer the payload to and from the storage region, to autonomously position the payload to satisfy a weight and balance criterion, and to autonomously secure the payload in preparation for and to increase safety of flight of the aerial vehicle.

2. The system of claim 1, where the array of powered lift devices, the forward wing, and the aft wing are positioned to prevent wakes from the array of powered lift devices and forward wing from impinging on any other component of the aerial vehicle during a hovering operation mode, a forward flight operation mode, and during transitions between the hovering operation mode and the forward flight operation mode.

3. The system of claim 2, wherein the forward wing comprises landing elements coupled to wing tips of the forward wing, with the forward wing acting to attenuate landing gear loads.

4. The system of claim 3, wherein powered lift devices of the array of powered lift devices are configured with dihedral to provide roll stability during vertical flight phases of the aerial vehicle.

5. The system of claim 4, wherein the forward wing comprises an anhedral angle and wherein the aft wing comprises a dihedral angle and wherein a dihedral angle of the aft wing is configured to counteract an anhedral angle of the forward wing, in order to provide lateral and directional stability, and enhance spin recovery of the aerial vehicle.

6. The system of claim 5, further comprising upward sloping winglets positioned at outboard tips of the forward wing, said upward sloping winglets configured to prevent wing tip dig in during landing of the aerial vehicle, and said upward sloping winglets configured to decrease aerodynamic drag during forward flight of the aerial vehicle.

* * * * *